(12) United States Patent
Liou

(10) Patent No.: US 7,295,280 B2
(45) Date of Patent: Nov. 13, 2007

(54) METHOD OF MANUFACTURING ONE DROP FILL LIQUID CRYSTAL DISPLAY PANEL

(75) Inventor: Louis Liou, Taoyuan Hsien (TW)

(73) Assignee: Hannstar Display Corp., Taipei (TW)

( * ) Notice: Subject to any disclaimer, the term of this patent is extended or adjusted under 35 U.S.C. 154(b) by 274 days.

(21) Appl. No.: 10/938,313

(22) Filed: Sep. 10, 2004

(65) Prior Publication Data

US 2005/0030471 A1    Feb. 10, 2005

Related U.S. Application Data

(63) Continuation-in-part of application No. 10/093,581, filed on Mar. 8, 2002, now abandoned.

(30) Foreign Application Priority Data

Sep. 3, 2001    (TW) .............................. 90121738 A

(51) Int. Cl.
*G02F 1/1339*    (2006.01)
(52) U.S. Cl. ..................................... 349/190
(58) Field of Classification Search .................. 349/190
See application file for complete search history.

(56) References Cited

U.S. PATENT DOCUMENTS

| | | | |
|---|---|---|---|
| 5,677,749 A | 10/1997 | Tsubota et al. | |
| 6,219,126 B1 * | 4/2001 | Von Gutfeld | 349/153 |
| 6,222,603 B1 * | 4/2001 | Sakai et al. | 349/153 |
| 6,299,949 B1 | 10/2001 | Shioda et al. | |
| 6,417,898 B1 | 7/2002 | Izumi | |
| 6,417,908 B2 | 7/2002 | Nishiguchi et al. | |
| 6,567,147 B1 * | 5/2003 | Hirakata | 349/153 |
| 6,567,152 B2 | 5/2003 | Jun | |
| 6,593,993 B1 | 7/2003 | Jun | |
| 6,636,290 B1 * | 10/2003 | Glownia et al. | 349/187 |
| 6,642,992 B2 * | 11/2003 | Kim | 349/191 |
| 6,747,724 B2 * | 6/2004 | Onaka et al. | 349/149 |
| 6,842,208 B2 * | 1/2005 | Takasaki et al. | 349/110 |
| 6,914,658 B2 * | 7/2005 | Seshan et al. | 349/153 |
| 6,937,315 B2 * | 8/2005 | Lee et al. | 349/153 |
| 6,965,424 B2 * | 11/2005 | Liu et al. | 349/187 |
| 2006/0114406 A1 * | 6/2006 | von Gutfeld et al. | 349/190 |

FOREIGN PATENT DOCUMENTS

| | | |
|---|---|---|
| JP | 06-175140 | 6/1994 |
| JP | 2000-227598 | 8/2000 |
| JP | 2001-066612 | 3/2001 |
| JP | 2001-117105 | 4/2001 |

* cited by examiner

*Primary Examiner*—James A. Dudek
(74) *Attorney, Agent, or Firm*—Merchant & Gould P.C.

(57) ABSTRACT

A method of manufacturing an ODF (one drop fill) LCD panel. A first substrate with a black matrix and a second substrate opposite thereto are provided. A first sealant area is formed on a peripheral region of the first substrate or the second substrate. The first sealant area is separated from the black matrix area by a space in a range of from 0 to 10 mm. The first sealant area is cured by applying a curing light from a side of the first substrate and through the first substrate to harden the first sealant area without light shielding resulting from the black matrix area.

20 Claims, 20 Drawing Sheets

METHOD OF MANUFACTURING ONE DROP FILL LIQUID CRYSTAL DISPLAY PANEL

This is a CIP of application Ser. No. 10/093,581, filing date Mar. 8, 2002, now abandoned.

BACKGROUND

The invention relates in general to a method of manufacturing a liquid crystal display (LCD) panel. In particular, the invention relates to a method of manufacturing an ODF (one drop fill) LCD panel.

FIG. 1a is a perspective view showing a conventional one drop fill liquid crystal display (ODF LCD) panel. FIG. 1b is a sectional view showing the conventional ODF LCD panel. In FIGS. 1a and 1b, a color pixel area 3, a black matrix 5 and a sealant 7 are respectively positioned on the surface of a first substrate 1, and a liquid crystal material 8 is located on a second substrate 9. In the process of manufacturing a conventional ODF LCD panel, it is necessary to apply ultraviolet light (UV light, not shown) to harden the sealant 7 while superposing the first substrate 1 and the second substrate 9. However, when the UV light is applied from the side of the second substrate 9, the UV light is partly shielded by the circuits of the second substrate 9. As a result, the sealant 7 cannot completely harden. This may cause the liquid crystal material 8 to become polluted and decrease the efficiency of the liquid crystal material 8. In addition, the MURA issue often occurs in the edge potion of the display panel. On the other hand, when the UV light is applied from the side of the first substrate 1, the UV light is still partly shielded by the black matrix 5 of the first substrate 1. As a result, the sealant 7 cannot completely harden, once again raising the possibility that the liquid crystal material 8 will become polluted and decrease the efficiency of the liquid crystal material 8. In addition, the MURA issue often occurs in the edge potion of the display panel.

SUMMARY

Embodiments of the invention provide a method of manufacturing an ODF-LCD panel.

In order to achieve these aims, embodiments of the invention provide a method of manufacturing an ODF-LCD panel. A first substrate comprising a first central region and a first peripheral region is provided, wherein a color pixel area and a black matrix area are positioned on the first central region. A second substrate comprising a second central region and a second peripheral region is provided, wherein the second central region and the second peripheral region are positioned opposite to the first central region and the first peripheral region respectively. A first sealant area is formed on the first peripheral region at an outside of the black matrix area, wherein the first sealant area is separated from the black matrix area by a first predetermined space in a range of from 0 to 10 mm. At least one drop of a liquid crystal is dispersed on the second central region. The first substrate and the second substrate are superposed under a condition of reduced ambient air pressure. The first sealant area is cured by applying a curing light from a side of the first substrate and through the first substrate to harden the first sealant area without light shielding resulting from the black matrix area, wherein a wavelength of the curing light is about between 300 nm and 500 nm.

Embodiments of the invention additionally provide a method of manufacturing an ODF-LCD panel. A first substrate comprising a first central region and a first peripheral region is provided, wherein a color pixel area and a black matrix area are positioned on the first central region. A second substrate comprising a second central region and a second peripheral region is provided, wherein the second central region and the second peripheral region are positioned opposite to the first central region and the first peripheral region respectively. A first sealant area is formed on the second peripheral region at an outside of the black matrix area, wherein the first sealant area is separated from the black matrix area by a first predetermined space in a range of from 0 to 10 mm. At least one drop of a liquid crystal is dispersed on the second central region. The first substrate and the second substrate are superposed under a condition of reduced ambient air pressure. The first sealant area is cured by applying a curing light from a side of the first substrate and through the first substrate to harden the first sealant area without light shielding resulting from the black matrix area, wherein a wavelength of the curing light is about between 300 nm and 500 nm.

The ODF-LCD panel of the embodiments further comprises at least one sealant loop surrounding the first sealant area, preventing the first sealant area from damage during vacuum breaking. An insulating rib is formed between the black matrix and the first sealant area to prevent the liquid crystal from sealant contamination.

Embodiments of the invention improve on the conventional technology in that the first sealant area is separated from the black matrix area by a space in a range of from 0 to 10 mm. The first sealant area is cured by applying a curing light from a side of the first substrate and through the first substrate to harden the first sealant area without light shielding resulting from the black matrix area. The method according to embodiments of the invention can completely harden the first sealant area, thereby preventing pollution of the liquid crystal and ameliorating disadvantages of the conventional technology.

BRIEF DESCRIPTION OF THE DRAWINGS

The invention will become more fully understood from the detailed description given in the following and the accompanying drawings, given by way of illustration only and thus not intended to be limitative of the invention, and wherein

FIG. 1b is a sectional view showing the conventional ODF LCD panel of FIG. 1a;

FIG. 2b is a sectional view showing the ODF LCD panel of FIG. 2a;

FIG. 3b is a sectional view showing the ODF LCD panel of FIG. 3a;

FIG. 4b is a sectional view showing the ODF LCD panel of FIG. 4a;

FIG. 5b is a sectional view showing the ODF LCD panel of FIG. 5a;

FIG. 6b is a sectional view showing the ODF LCD panel of FIG. 6a;

FIG. 7b is a sectional view showing the ODF LCD panel of FIG. 7a;

FIG. 8b is a sectional view showing the ODF LCD panel of FIG. 8a;

FIG. 9b is a sectional view showing the ODF LCD panel of FIG. 9a;

FIG. 10b is a sectional view showing the ODF LCD panel of FIG. 10a;

FIG. 11b is a sectional view showing the ODF LCD panel of FIG. 11a;

DETAILED DESCRIPTION

First Embodiment

Figure 1A:
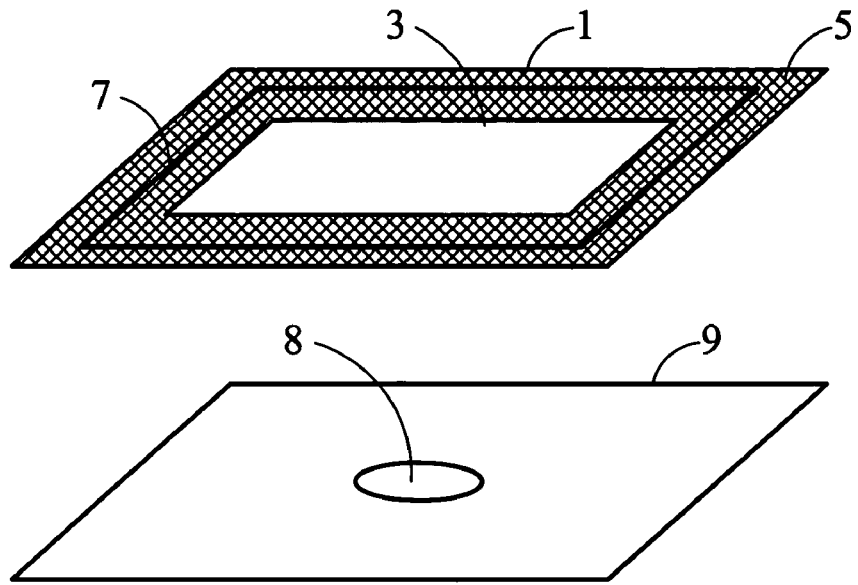
FIG. 1a is a perspective view showing a conventional ODF LCD panel.
Figure 1B:
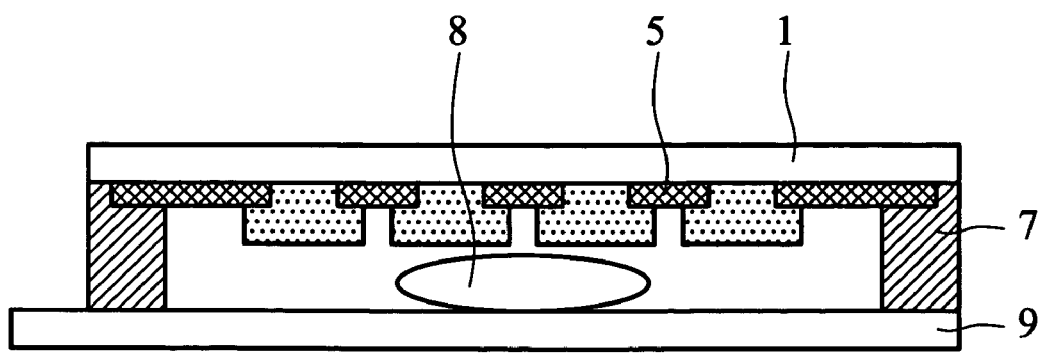
Figure 2A:
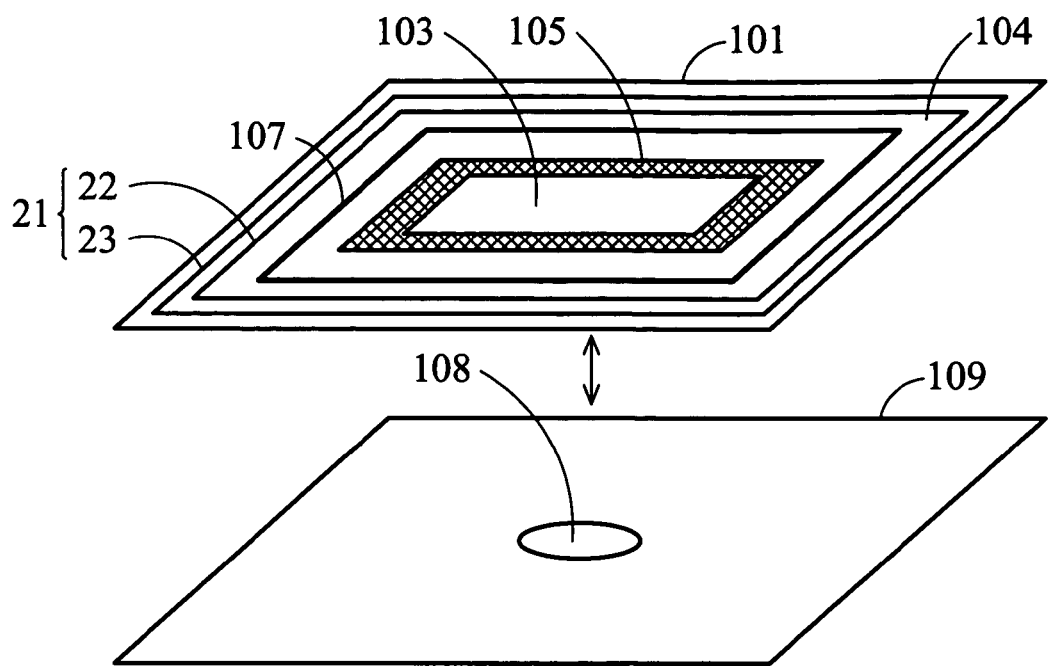
FIG. 2a is a perspective view showing an ODF LCD panel of the first embodiment of the invention.
Figure 2B:
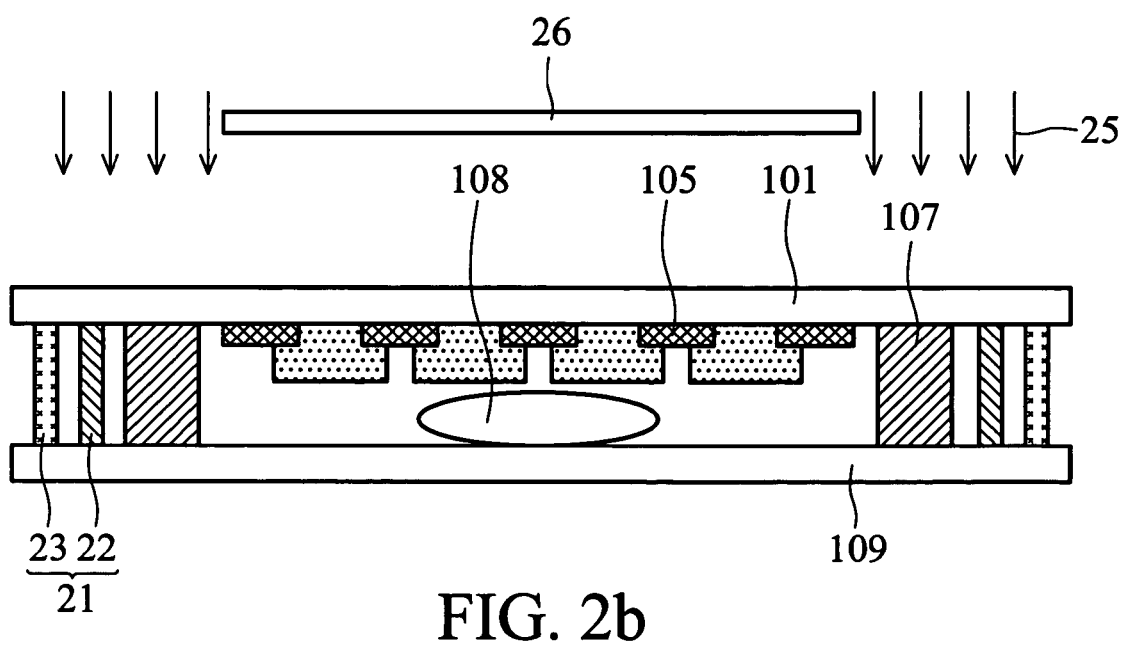

FIG. 2a is a perspective view showing an ODF LCD panel of the first embodiment of the invention. FIG. 2b is a sectional view showing the ODF LCD panel of FIG. 2a. A color pixel area 103 and a black matrix area 105 are formed on a first substrate 101. In FIG. 2a, a first sealant area 107 serving as a main sealant area is formed on a first peripheral region 104 of the first substrate 101. The first sealant area 107 is located at a position opposite to the outside of the black matrix area 105 and separated from the black matrix area 105 by a first predetermined space in a range of from 0 to 10 mm. A sealant loop 21 can be formed on the first peripheral region 104 to surround the first sealant area 107. In this case, the sealant loop 21 comprises a second sealant area 22 and a third sealant area 23. The second sealant area 22 is located between the first sealant area 107 and the third sealant area 23. The first, second and third sealant areas 107, 22 and 23 comprise UV epoxy, acrylic resin, epoxy mixed with acrylic resin or epoxy-acrylic copolymer. Note that, a height of the third sealant area 23 is preferably greater than that of the first sealant area 107 before performing subsequent superposing process. The third sealant area 23 serves as a dummy sealant area to compensate thickness variation of the substrates 101 and 109 during subsequent superposing process.

At least one drop of a liquid crystal 108 is then dripped down on a second substrate 109. Next, a superposing process for coupling the two substrates 101 and 109 is performed. The first substrate 101 and the second substrate 109 are superposed face-to-face as shown in FIG. 2a under a condition of reduced ambient air pressure (e.g. vacuum condition), coupling the two substrates 101 and 109. Vacuum breaking is then performed to disperse the liquid crystal 108. During vacuum breaking, the second sealant area 22 can protect the first sealant area 107 from damage.

The sealant areas 107, 22 and 23 are then cured by applying curing light 25 from a side of the first substrate 101. In FIG. 2b, numeral 26 denotes a light shield corresponding to the color pixel area 103 to prevent the liquid crystal 108 from deterioration caused by the curing light 25. An ODF LCD panel is thus obtained. An operational condition of the curing is illustrated as the following, but is not intended to limit the invention. The wavelength of the curing light 25 is about between 300 nm and 500 nm. Particularly, the sealant areas 107, 22 and 23 are heated to a temperature range of 100° C. to 150° C. The heating time of curing the first sealant area 107 keeps in a range of from 0.5 to 3 hours. The first sealant area 107 absorbs 3000~8000 mJ/cm² under the curing light 25 having a wavelength of 300-500 nm.

According to FIG. 2b, because the first sealant area 107 and the black matrix area 105 are separated by the space, the first sealant area 107 is completely hardened while applying ultraviolet light from the side of the first substrate 101 without the light shielding problems resulting from the black matrix area 105, such that the conventional non-cured problem and MURA issue are thoroughly solved.

Furthermore, the above liquid crystal 108, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Second Embodiment

Figure 3A:
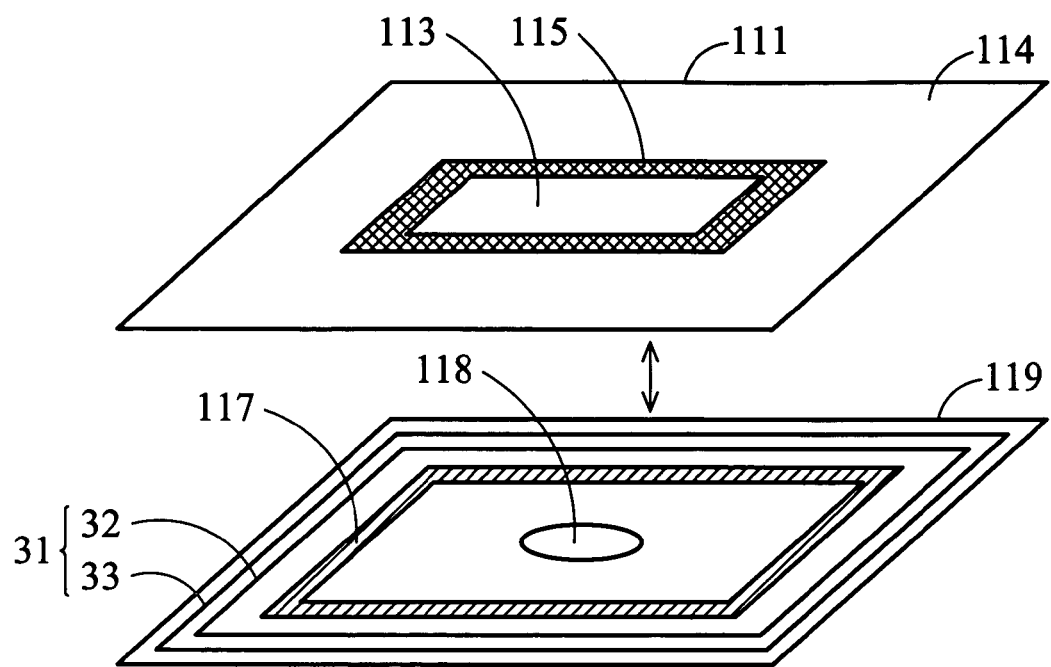
FIG. 3a is a perspective view showing an ODF LCD panel of the second embodiment of the invention.
Figure 3B:
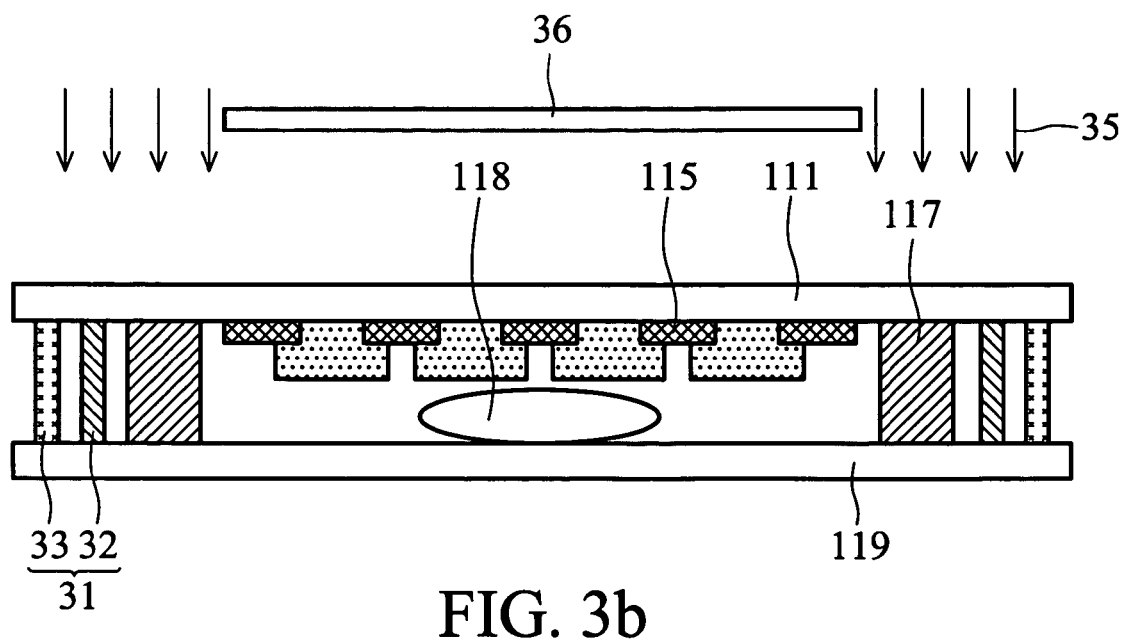

FIG. 3a is a perspective view showing an ODF LCD panel of the second embodiment of the invention. FIG. 3b is a sectional view showing the ODF LCD panel of FIG. 3a. A color pixel area 113 and a black matrix area 115 are formed on a first substrate 111. In FIG. 3a, a first sealant area 117 serving as a main sealant area is formed on a second substrate 119, corresponding to a first peripheral region 114 of the first substrate 111. The first sealant area 117 corresponds to a position opposite to the outside of the black matrix area 115 and separated from the black matrix area 115 by a first predetermined space in a range of from 0 to 10 mm. A sealant loop 31 can be formed on the second substrate 119 to surround the first sealant area 117. In this case, the sealant loop 31 comprises a second sealant area 32 and a third sealant area 33. Particularly, the second sealant area 32 and the first sealant area 117 are formed in the same process. The second sealant area 32 is located between the first sealant area 117 and the third sealant area 33. The first, second and third sealant areas 117, 32 and 33 comprise UV epoxy, acrylic resin, epoxy mixed with acrylic resin or epoxy-acrylic copolymer. Note that, a height of the third sealant area 33 is preferably greater than that of the first sealant area 117 before performing subsequent superposing process. The third sealant area 33 serves as a dummy sealant area to compensate thickness variation of the substrates 111 and 119 during subsequent superposing process.

At least one drop of a liquid crystal 118 is dripped down on the second substrate 119. Next, a superposing process for coupling the two substrates 111 and 119 is performed. The first substrate 111 and the second substrate 119 are superposed face-to-face as shown in FIG. 3a under a condition of reduced ambient air pressure (e.g. vacuum condition), coupling the two substrates 111 and 119. Vacuum breaking is then performed to disperse the liquid crystal 118. During vacuum breaking, the second sealant area 32 can protect the first sealant area 117 from damage.

The sealant areas 117, 32 and 33 are then cured by applying curing light 35 from a side of the first substrate 111. In FIG. 3b, numeral 36 denotes a light shield corresponding to the color pixel area 113 to prevent the liquid crystal 118 from deterioration caused by the curing light 35. An ODF LCD panel is thus obtained. An operational condition of the curing is illustrated as the following, but is not intended to limit the invention. The wavelength of the curing light 35 is about between 300 nm and 500 nm. Particularly, the sealant areas 117, 32 and 33 can also be heated to a temperature range of 100° C. to 150° C. The heating time of curing the first sealant area 117 keeps in a range of from 0.5 to 3 hours. The first sealant area 117 absorbs 3000~8000 mJ/cm$^2$ under the curing light 25 having a wavelength of 300-500 nm.

According to FIG. 3b, because the first sealant area 117 and the black matrix area 115 are separated by the space, the first sealant area 117 is completely hardened while applying ultraviolet light from the side of the first substrate 111 without the light shielding problems resulting from the black matrix area 115, such that the conventional non-cured problem and MURA issue are thoroughly solved.

Furthermore, the above liquid crystal 118, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Third Embodiment

Figure 4A:
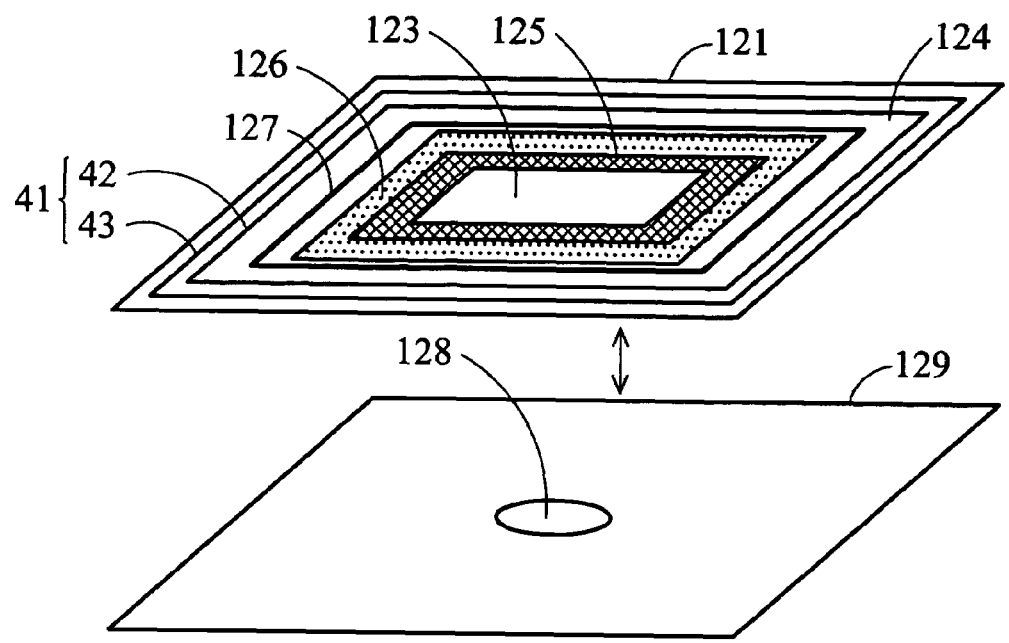
FIG. 4a is a perspective view showing an ODF LCD panel of the third embodiment of the invention.
Figure 4B:
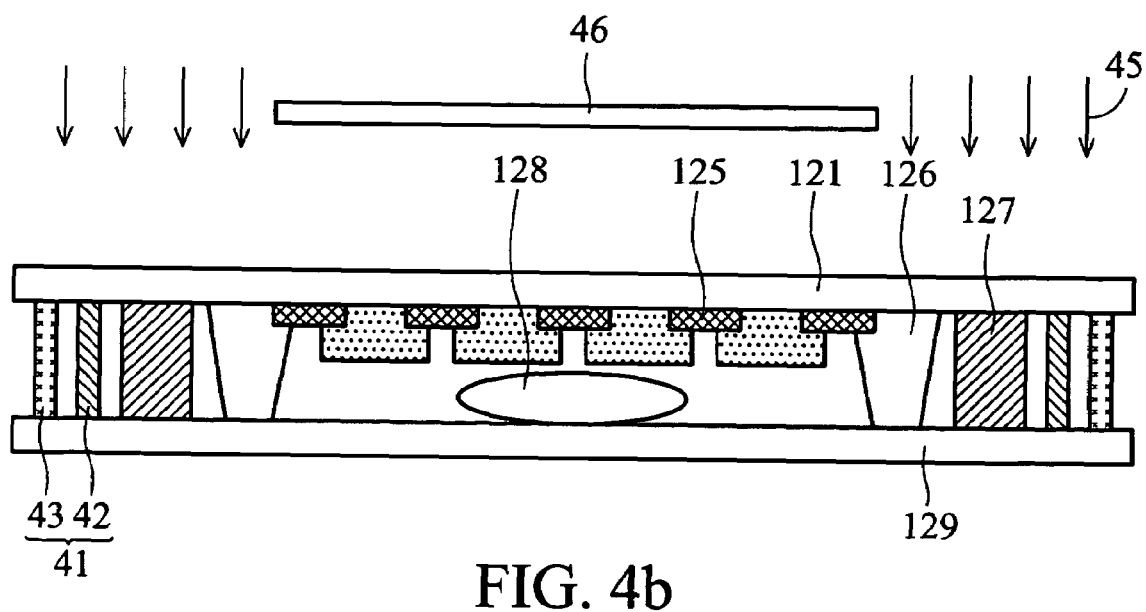

FIG. 4a is a perspective view showing an ODF LCD panel of the third embodiment of the invention. FIG. 4b is a sectional view showing the ODF LCD panel of FIG. 4a. A color pixel area 123 and a black matrix area 125 are formed on a first substrate 121. In FIG. 4a, a partition rib 126 is formed on an outside edge of the black matrix area 125. The partition rib 126 can be a SiO$_2$ or photosensitive polymer layer. The partition rib 126 overlaps the outside edge of the black matrix area 125. A first sealant area 127 is formed on a first peripheral region 124 of the first substrate 121 and located at the outside of the partition rib 126. A sealant loop 41 can be formed on the first substrate 121 to surround the first sealant area 127. In this case, the sealant loop 41 comprises a second sealant area 42 and a third sealant area 43. Particularly, the second sealant area 42 and the first sealant area 127 are formed in the same process. The second sealant area 42 is located between the first sealant area 127 and the third sealant area 43. The first, second and third sealant areas 127, 42 and 43 comprise UV epoxy, acrylic resin, epoxy mixed with acrylic resin or epoxy-acrylic copolymer. Note that, a height of the third sealant area 43 is preferably greater than that of the first sealant area 127 before performing subsequent superposing process. The third sealant area 43 serves as a dummy sealant area to compensate thickness variation of the substrates 121 and 129 during subsequent superposing process.

At least one drop of a liquid crystal 128 is dripped down on a second substrate 129. Next, a superposing process for coupling the two substrates 121 and 129 is performed. The first substrate 121 and the second substrate 129 are superposed face-to-face as shown in FIG. 4a under a condition of reduced ambient air pressure (e.g. vacuum condition), coupling the two substrates 121 and 129. Vacuum breaking is then performed to disperse the liquid crystal 128. During vacuum breaking, the second sealant area 42 can protect the first sealant area 127 from damage.

The sealant areas 127, 42 and 43 are then cured by applying curing light 45 from a side of the first substrate 121. In FIG. 4b, numeral 46 denotes a light shield corresponding to the color pixel area 123 to prevent the liquid crystal 128 from deterioration caused by the curing light 45. An ODF LCD panel is thus obtained. An operational condition of the curing is illustrated as the following, but is not intended to limit the invention. The wavelength of the curing light 45 is about between 300 nm and 500 nm. Particularly, the sealant areas 127, 42 and 43 can also be heated to a temperature range of 100° C. to 150° C. The heating time of curing the first sealant area 127 keeps in a range of from 0.5 to 3 hours. The first sealant area 127 absorbs 3000~8000 mJ/cm$^2$ under the curing light 45 having a wavelength of 300-500 nm.

According to FIG. 4b, because the first sealant area 127 and the black matrix area 125 are separated by the partition rib 126, the first sealant area 127 is completely hardened while applying ultraviolet light from the side of the first substrate 121 without the light shielding problems resulting, from the black matrix area 125, thereby preventing pollution of the liquid crystal 128 and improving the efficiency of the liquid crystal 128. Additionally, if the sealant areas 127, 42 and/or 43 have a non-cured region, the partition rib 126 can prevent the liquid crystal 128 from sealant contamination.

Furthermore, the above liquid crystal 128, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Fourth Embodiment

Figure 5A:
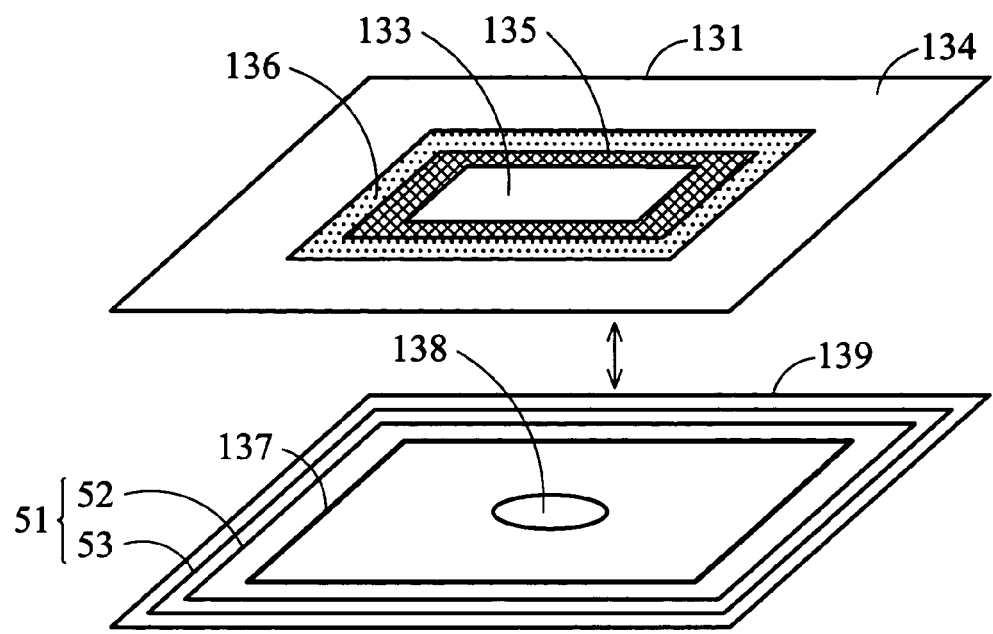
FIG. 5a is a perspective view showing an ODF LCD panel of the fourth embodiment of the invention.
Figure 5B:
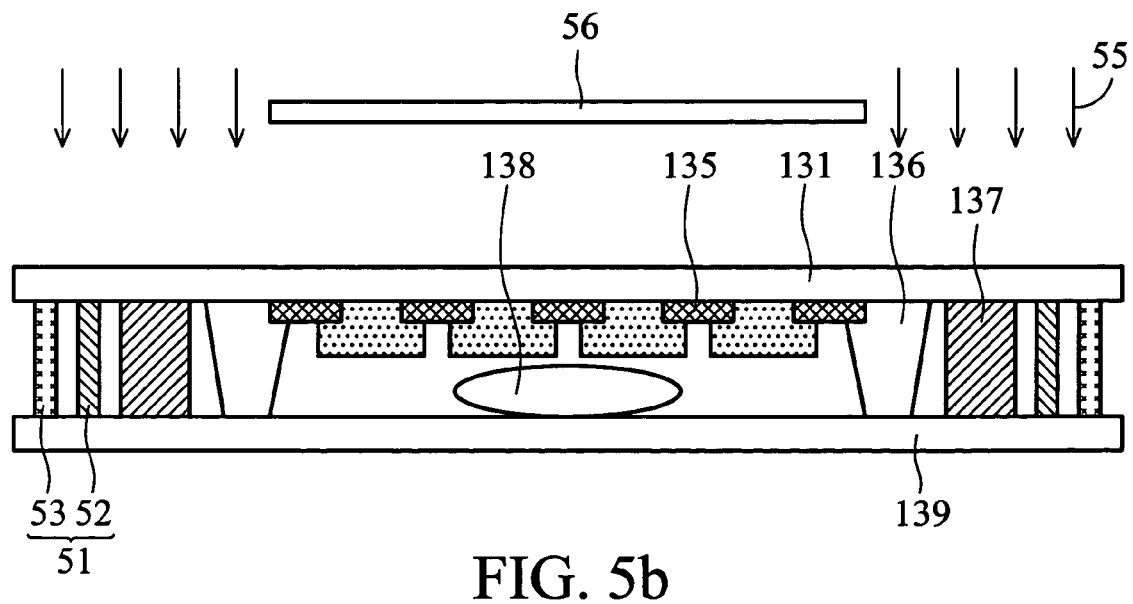

FIG. 5a is a perspective view showing an ODF LCD panel of the fourth embodiment of the invention. FIG. 5b is a sectional view showing the ODF LCD panel of FIG. 5a. A color pixel area 133 and a black matrix area 135 are formed on a first substrate 131. In FIG. 5a, a partition rib 136 is formed on an outside edge of the black matrix area 135 in a first peripheral region 134 of the first substrate 131. The partition rib 136 can be a SiO$_2$ or photosensitive polymer layer. The partition rib 136 overlaps the outside edge of the black matrix area 135. A first sealant area 137 is formed on a second substrate 139 and corresponds to a position opposite to the outside of the partition rib 136. A sealant loop 51 can be formed on the second substrate 139 to surround the first sealant area 137. In this case, the sealant loop 51 comprises a second sealant area 52 and a third sealant area 53. The second sealant area 52 is located between the first sealant area 137 and the third sealant area 53. The first, second and third sealant areas 137, 52 and 53 comprise UV epoxy, acrylic resin, epoxy mixed with acrylic resin or epoxy-acrylic copolymer. Note that, a height of the third sealant area 53 is preferably greater than that of the first sealant area 137 before performing subsequent superposing process. The third sealant area 53 serves as a dummy sealant area to compensate thickness variation of the substrates 131 and 139 during subsequent superposing process.

At least one drop of a liquid crystal 138 is dripped down on the second substrate 139. Next, a superposing process for coupling the two substrates 131 and 139 is performed. The first substrate 131 and the second substrate 139 are superposed face-to-face as shown in FIG. 5a under a condition of reduced ambient air pressure (e.g. vacuum condition), coupling the two substrates 131 and 139. Vacuum breaking is then performed to disperse the liquid crystal 138. During vacuum breaking, the second sealant area 52 can protect the first sealant area 137 from damage.

The sealant areas 137, 52 and 53 are then cured by applying curing light 55 from a side of the first substrate 131. In FIG. 5b, numeral 56 denotes a light shield corresponding to the color pixel area 133 to prevent the liquid crystal 138 from deterioration caused by the curing light 55. An ODF LCD panel is thus obtained. An operational condition of the curing is illustrated as the following, but is not intended to limit the invention. The wavelength of the curing light 55 is about between 300 nm and 500 nm. Particularly, the sealant areas 137, 52 and 53 can also be heated to a temperature range of 100° C. to 150° C. The heating time of curing the first sealant area 137 keeps in a range of from 0.5 to 3 hours. The first sealant area 137 absorbs 3000~8000 mJ/cm$^2$ under the curing light 55 having a wavelength of 300-500 nm.

According to FIG. 5b, because the first sealant area 137 and the black matrix area 135 are separated by the partition rib 136, the first sealant area 137 is completely hardened while applying ultraviolet light from the side of the first substrate 131 without the light shielding problems resulting from the black matrix area 135, thereby preventing pollution of the liquid crystal 138 and improving the efficiency of the liquid crystal 138. Additionally, if the sealant areas 137, 52 and/or 53 have a non-cured region, the partition rib 136 can prevent the liquid crystal 138 from sealant contamination.

Furthermore, the above liquid crystal 138, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Fifth Embodiment

Figure 6A:
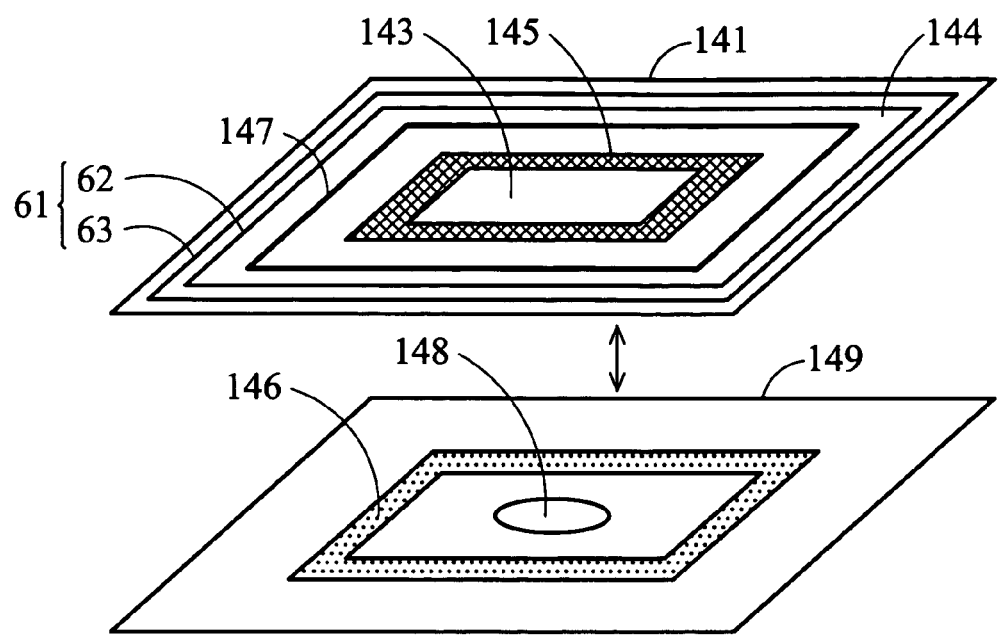
FIG. 6a is a perspective view showing an ODF LCD panel of the fifth embodiment of the invention.
Figure 6B:
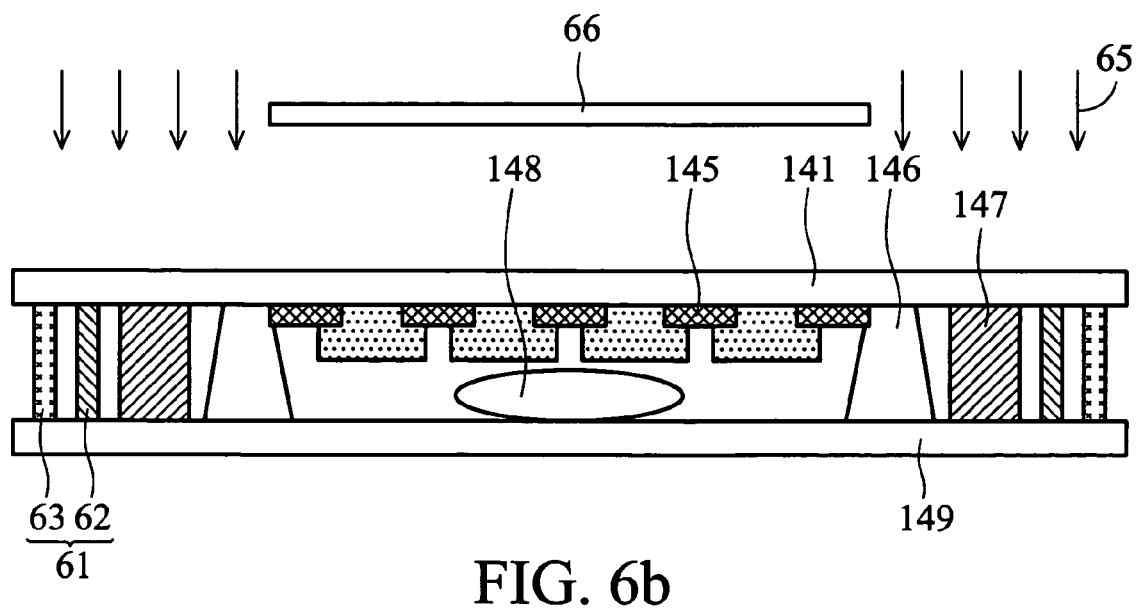

FIG. 6a is a perspective view showing an ODF LCD panel of the fifth embodiment of the invention. FIG. 6b is a sectional view showing the ODF LCD panel of FIG. 6a. A color pixel area 143 and a black matrix area 145 are formed on a first substrate 141. In FIG. 6a, a partition rib 146 is formed on a second substrate 149 and corresponds to a position opposite to the outside edge of the black matrix area 145. A first sealant area 147 is formed on a first peripheral region 144 of the first substrate 141 and corresponds to a position opposite to the outside of the partition rib 146. A sealant loop 61 can be formed on the first substrate 141 to surround the first sealant area 147. In this case, the sealant loop 61 comprises a second sealant area 62 and a third sealant area 63. The second sealant area 62 is located between the first sealant area 147 and the third sealant area 63. The first, second and third sealant areas 147, 62 and 63 comprise UV epoxy, acrylic resin, epoxy mixed with acrylic resin or epoxy-acrylic copolymer. Note that, a height of the third sealant area 63 is preferably greater than that of the first sealant area 147 before performing subsequent superposing process. The third sealant area 63 serves as a dummy sealant area to compensate thickness variation of the substrates 141 and 149 during subsequent superposing process.

At least one drop of a liquid crystal 148 is dripped down on the second substrate 149. Next, a superposing process for coupling the two substrates 141 and 149 is performed. The first substrate 141 and the second substrate 149 are superposed face-to-face as shown in FIG. 6a under a condition of reduced ambient air pressure (e.g. vacuum condition), coupling the two substrates 141 and 149. Vacuum breaking is then performed to disperse the liquid crystal 148. During vacuum breaking, the second sealant area 62 can protect the first sealant area 147 from damage.

The sealant areas 147, 62 and 63 are then cured by applying curing light 65 from a side of the first substrate 141. In FIG. 6b, numeral 66 denotes a light shield corresponding to the color pixel area 143 to prevent the liquid crystal 148 from deterioration caused by the curing light 65. An ODF LCD panel is thus obtained. An operational condition of the curing is illustrated as the following, but is not intended to limit the invention. The wavelength of the curing light 65 is about between 300 nm and 500 nm. Particularly, the sealant areas 147, 62 and 63 can also be heated to a temperature range of 100° C. to 150° C. The heating time of curing the first sealant area 147 keeps in a range of from 0.5 to 3 hours. The first sealant area 147 absorbs 3000~8000 mJ/cm$^2$ under the curing light 55 having a wavelength of 300-500 nm.

According to FIG. 6b, because the first sealant area 147 and the black matrix area 145 are separated by the partition rib 146, the first sealant area 147 is completely hardened while applying ultraviolet light from the side of the first substrate 141 without the light shielding problems resulting from the black matrix area 145, thereby preventing pollution of the liquid crystal 148 and improving the efficiency of the liquid crystal 148. Additionally, if the sealant areas 147, 62 and/or 63 have a non-cured region, the partition rib 146 can prevent the liquid crystal 148 from sealant contamination.

Furthermore, the above liquid crystal 148, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Sixth Embodiment

Figure 7A:
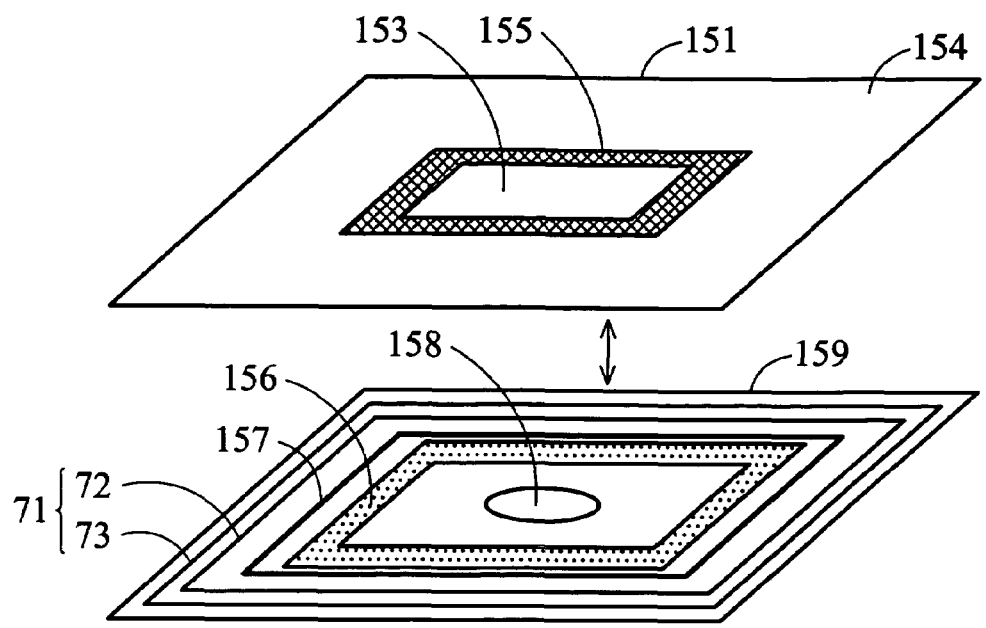
FIG. 7a is a perspective view showing an ODF LCD panel of the sixth embodiment of the invention.
Figure 7B:
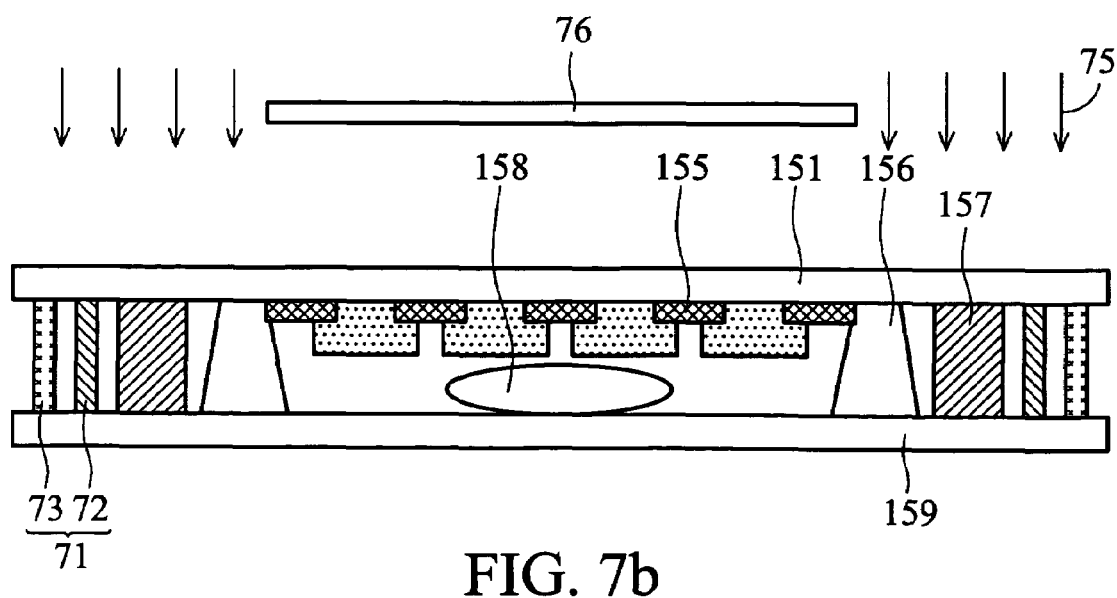

FIG. 7a is a perspective view showing an ODF LCD panel of the sixth embodiment of the invention. FIG. 7b is a sectional view showing the ODF LCD panel of FIG. 7a. A color pixel area 153 and a black matrix area 155 are formed on a first substrate 151. In FIG. 7a, a partition rib 156 is formed on a second substrate 159 and corresponds to a position opposite to the outside edge of the black matrix area 155 in a first peripheral region 154 of the first substrate 151. A first sealant area 157 is formed on the second substrate 159 and located at the outside of the partition rib 156. A sealant loop 71 can be formed on the second substrate 159 to surround the first sealant area 157. In this case, the sealant loop 71 comprises a second sealant area 72 and a third sealant area 73. The second sealant area 72 is located between the first sealant area 157 and the third sealant area 73. The first, second and third sealant areas 157, 72 and 73 comprise UV epoxy, acrylic resin, epoxy mixed with acrylic resin or epoxy-acrylic copolymer. Note that, a height of the third sealant area 73 is preferably greater than that of the first sealant area 157 before performing subsequent superposing process. The third sealant area 73 serves as a dummy sealant area to compensate thickness variation of the substrates 151 and 159 during subsequent superposing process.

At least one drop of a liquid crystal 158 is dripped down on the second substrate 159. Next, a superposing process for coupling the two substrates 151 and 159 is performed. The first substrate 151 and the second substrate 159 are superposed face-to-face as shown in FIG. 7a under a condition of reduced ambient air pressure (e.g. vacuum condition), coupling the two substrates 151 and 159. Vacuum breaking is then performed to disperse the liquid crystal 158. During vacuum breaking, the second sealant area 72 can protect the first sealant area 157 from damage.

The sealant areas 157, 72 and 73 are then cured by applying curing light 75 from a side of the first substrate 151. In FIG. 7b, numeral 76 denotes a light shield corresponding to the color pixel area 153 to prevent the liquid crystal 158 from deterioration caused by the curing light 75. An ODF LCD panel is thus obtained. An operational condition of the curing is illustrated as the following, but is not intended to limit the invention. The wavelength of the curing light 75 is about between 300 nm and 500 nm. Particularly, the sealant areas 157, 62 and 63 can also be heated to a temperature range of 100° C. to 150° C. The heating time of curing the first sealant area 157 keeps in a range of from 0.5 to 3 hours. The first sealant area 157 absorbs 3000~8000 mJ/cm$^2$ under the curing light 75 having a wavelength of 300-500 nm.

According to FIG. 7b, because the first sealant area 157 and the black matrix area 155 are separated by the partition rib 156, the first sealant area 157 is completely hardened while applying ultraviolet light from the side of the first substrate 151 without the light shielding problems resulting from the black matrix area 155, thereby preventing pollution of the liquid crystal 158 and improving the efficiency of the liquid crystal 158. Additionally, if the sealant areas 157, 72 and/or 73 have a non-cured region, the partition rib 156 can prevent the liquid crystal 158 from sealant contamination.

Furthermore, the above liquid crystal 158, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Seventh Embodiment

Figure 8A:
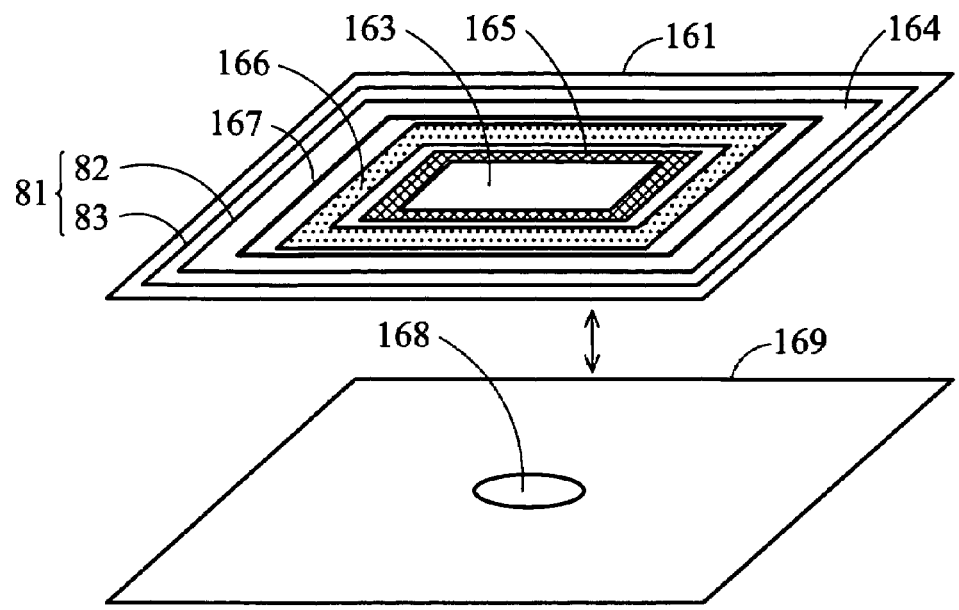
FIG. 8a is a perspective view showing an ODF LCD panel of the seventh embodiment of the invention.
Figure 8B:
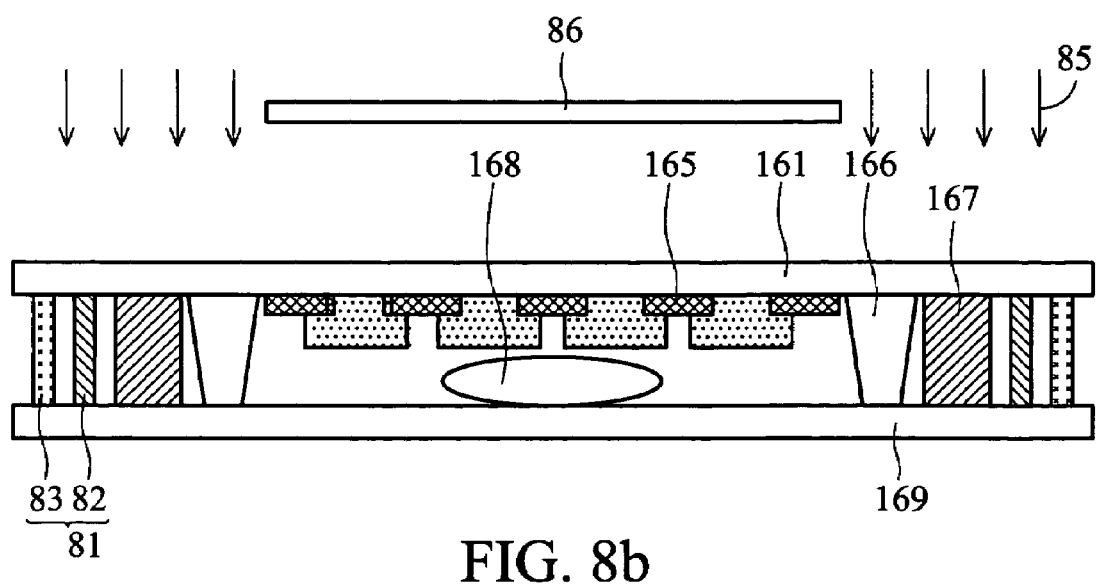

FIG. 8a is a perspective view showing an ODF LCD panel of the seventh embodiment of the invention. FIG. 8b is a sectional view showing the ODF LCD panel of FIG. 8a. A color pixel area 163 and a black matrix area 165 are formed on a first substrate 161. In FIG. 8a, a partition rib 166 is formed on a first peripheral region 164 of the first substrate 161. The partition rib 166 is located at the outside of the black matrix area 165 and is separated from the black matrix area 165 by a second predetermined space. A first sealant area 167 is formed on the first peripheral region 164 and located at the outside of the partition rib 166. A sealant loop 81 can be formed on the first substrate 161 to surround the first sealant area 167. In this case, the sealant loop 81 comprises a second sealant area 82 and a third sealant area 83. The second sealant area 82 is located between the first sealant area 167 and the third sealant area 83. The first, second and third sealant areas 167, 82 and 83 comprise UV epoxy, acrylic resin, epoxy mixed with acrylic resin or epoxy-acrylic copolymer. Note that, a height of the third sealant area 83 is preferably greater than that of the first sealant area 167 before performing subsequent superposing process. The third sealant area 83 serves as a dummy sealant area to compensate thickness variation of the substrates 161 and 169 during subsequent superposing process.

At least one drop of a liquid crystal 168 is dripped down on a second substrate 169. Next, a superposing process for coupling the two substrates 161 and 169 is performed. The first substrate 161 and the second substrate 169 are superposed face-to-face as shown in FIG. 8a under a condition of reduced ambient air pressure (e.g. vacuum condition), coupling the two substrates 161 and 169. Vacuum breaking is then performed to disperse the liquid crystal 168. During vacuum breaking, the second sealant area 82 can protect the first sealant area 167 from damage.

The sealant areas 167, 82 and 83 are then cured by applying curing light 85 from a side of the first substrate 161. In FIG. 8b, numeral 86 denotes a light shield corresponding to the color pixel area 163 to prevent the liquid crystal 168 from deterioration caused by the curing light 85. An ODF LCD panel is thus obtained. An operational condition of the curing is illustrated as the following, but is not intended to limit the invention. The wavelength of the curing light 85 is about between 300 nm and 500 nm. Particularly, the sealant areas 167, 82 and 83 can also be heated to a temperature range of 100° C. to 150° C. The heating time of curing the first sealant area 167 keeps in a range of from 0.5 to 3 hours. The first sealant area 167 absorbs 3000~8000 mJ/cm$^2$ under the curing light 85 having a wavelength of 300-500 nm.

According to FIG. 8b, because the first sealant area 167 and the black matrix area 165 are separated by the partition rib 166, the first sealant area 167 is completely hardened while applying ultraviolet light from the side of the first substrate 161 without the light shielding problems resulting from the black matrix area 165, thereby preventing pollution of the liquid crystal 168 and improving the efficiency of the liquid crystal 168. Additionally, if the sealant areas 167, 82 and/or 83 have a non-cured region, the partition rib 166 can prevent the liquid crystal 168 from sealant contamination.

Furthermore, the above liquid crystal 168, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Eighth Embodiment

Figure 9A:
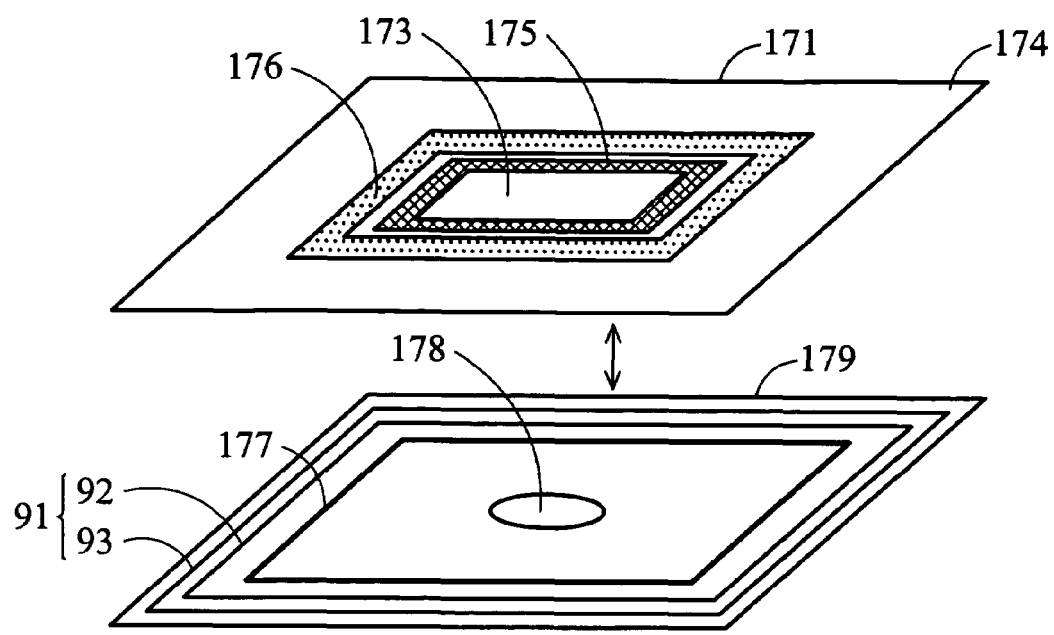
FIG. 9a is a perspective view showing an ODF LCD panel of the eighth embodiment of the invention.
Figure 9B:
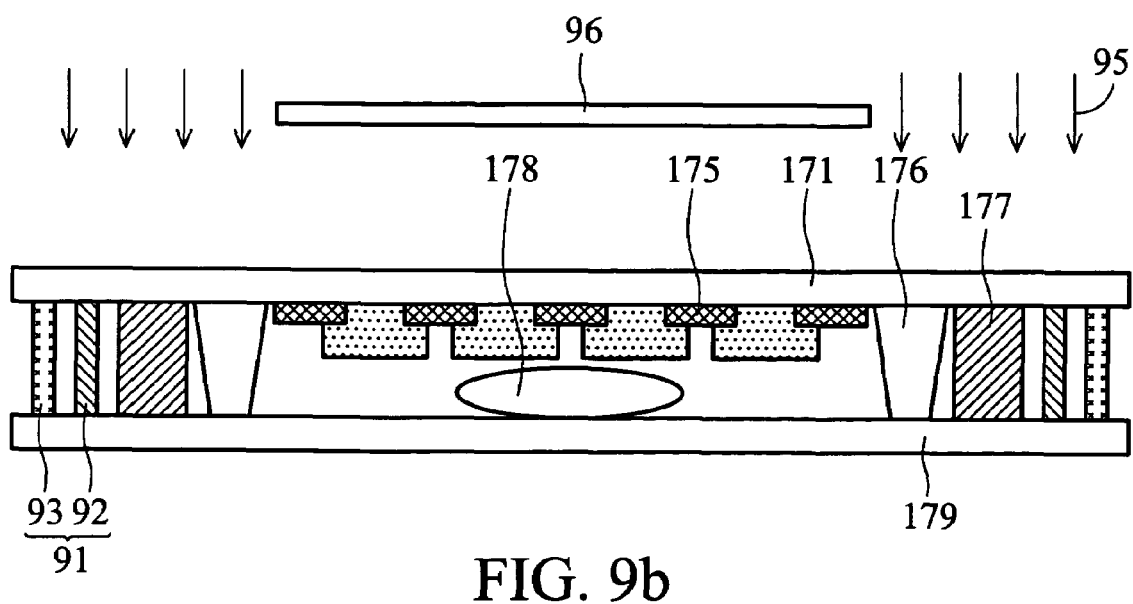

FIG. 9a is a perspective view showing an ODF LCD panel of the eighth embodiment of the invention. FIG. 9b is a sectional view showing the ODF LCD panel of FIG. 9a. A color pixel area 173 and a black matrix area 175 are formed on a first substrate 171. In FIG. 9a, a partition rib 176 is formed on a peripheral region 174 of the first substrate 171. The partition rib 176 is located at the outside of the black matrix area 175 and is separated from the black matrix area 175 by a second predetermined space. A first sealant area 177 is formed on a second substrate 179 and corresponds to a position opposite to the outside of the partition rib 176. A sealant loop 91 can be formed on the second substrate 179 to surround the first sealant area 177. In this case, the sealant loop 91 comprises a second sealant area 92 and a third sealant area 93. The second sealant area 92 is located between the first sealant area 177 and the third sealant area 93. The first, second and third sealant areas 177, 92 and 93 comprise UV epoxy, acrylic resin, epoxy mixed with acrylic resin or epoxy-acrylic copolymer. Note that, a height of the third sealant area 93 is preferably greater than that of the first sealant area 177 before performing subsequent superposing process. The third sealant area 93 serves as a dummy sealant area to compensate thickness variation of the substrates 171 and 179 during subsequent superposing process.

At least one drop of a liquid crystal 178 is dripped down on the second substrate 179. Next, a superposing process for coupling the two substrates 171 and 179 is performed. The first substrate 171 and the second substrate 179 are superposed face-to-face as shown in FIG. 9a under a condition of reduced ambient air pressure (e.g. vacuum condition), coupling the two substrates 171 and 179. Vacuum breaking is then performed to disperse the liquid crystal 178. During vacuum breaking, the second sealant area 92 can protect the first sealant area 177 from damage.

The sealant areas 177, 92 and 93 are then cured by applying curing light 95 from a side of the first substrate 171. In FIG. 9b, numeral 96 denotes a light shield corresponding to the color pixel area 173 to prevent the liquid crystal 178 from deterioration caused by the curing light 95. An ODF LCD panel is thus obtained. An operational condition of the curing is illustrated as the following, but is not intended to limit the 2b invention. The wavelength of the curing light 95 is about between 300 nm and 500 nm. Particularly, the sealant areas 177, 92 and 93 can also be heated to a temperature range of 100° C. to 150° C. The heating time of curing the first sealant area 177 keeps in a range of from 0.5 to 3 hours. The first sealant area 177 absorbs 3000~8000 mJ/cm$^2$ under the curing light 95 having a wavelength of 300-500 nm.

According to FIG. 9b, because the first sealant area 177 and the black matrix area 175 are separated by the partition rib 176, the first sealant area 177 is completely hardened while applying ultraviolet light from the side of the first substrate 171 without the light shielding problems resulting from the black matrix area 175, thereby preventing pollution of the liquid crystal 178 and improving the efficiency of the liquid crystal 178. Additionally, if the sealant areas 177, 92 and/or 93 have a non-cured region, the partition rib 176 can prevent the liquid crystal 178 from sealant contamination.

Furthermore, the above liquid crystal 178, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Ninth Embodiment

Figure 10A:
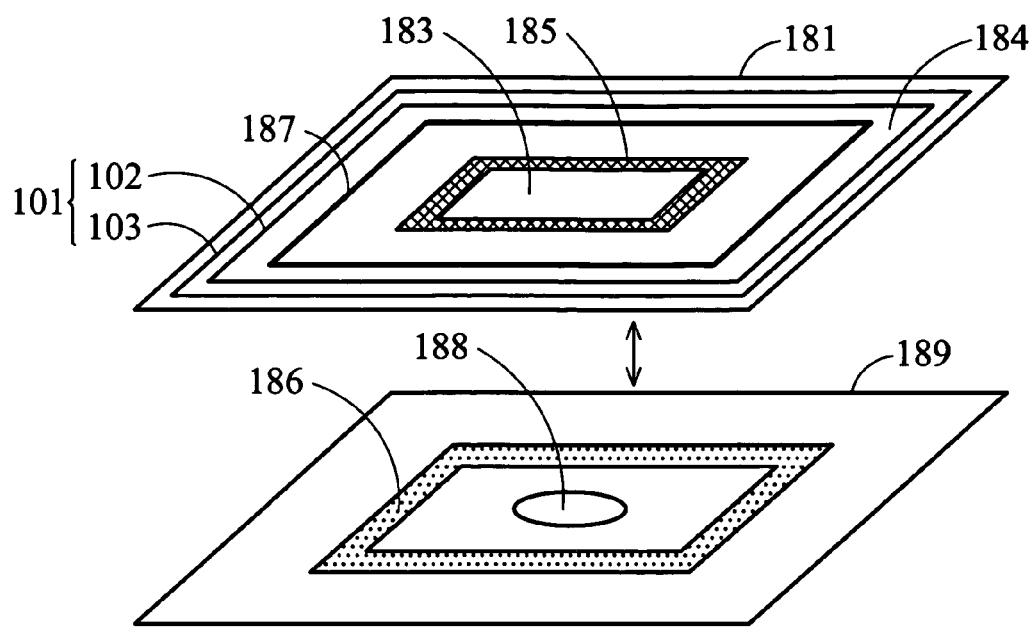
FIG. 10a is a perspective view showing an ODF LCD panel of the ninth embodiment of the invention.
Figure 10B:
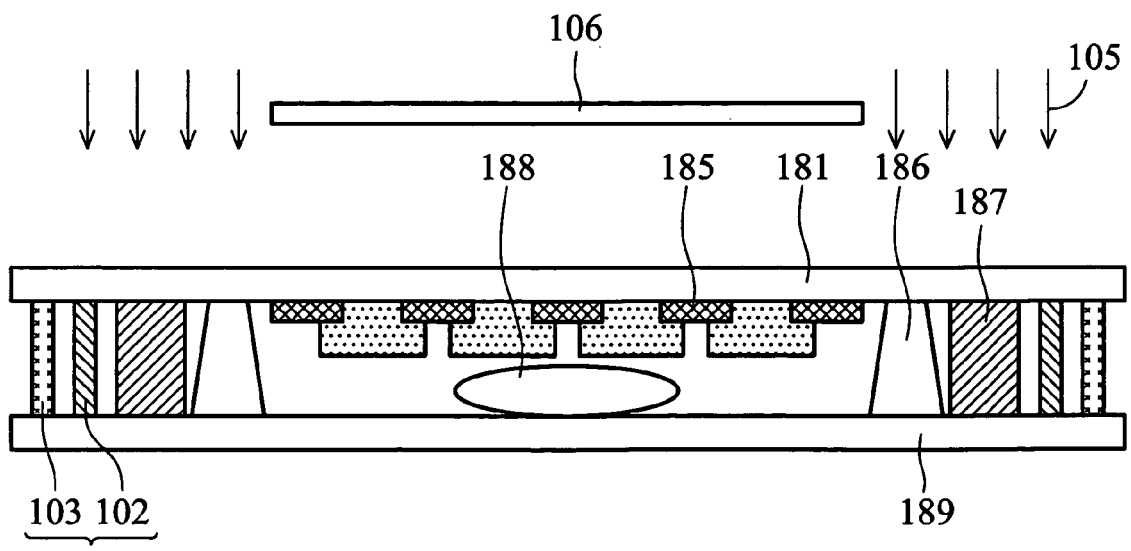

FIG. 10a is a perspective view showing an ODF LCD panel of the ninth embodiment of the invention. FIG. 10b is a sectional view showing the ODF LCD panel of FIG. 10a. A color pixel area 183 and a black matrix area 185 are formed on a first substrate 181. In FIG. 10a, a partition rib 186 is formed on a second substrate 189 and corresponds to a position opposite to the outside of the black matrix area 185. The partition rib 186 is separated from the black matrix area 185 by a second predetermined space. A first sealant area 187 is formed on a first peripheral region 184 of the first substrate 181 and corresponds to a position opposite to the outside of the partition rib 186. A sealant loop 101 can be formed on the first substrate 181 to surround the first sealant area 187. In this case, the sealant loop 101 comprises a second sealant area 102 and a third sealant area 103. The second sealant area 102 is located between the first sealant area 187 and the third sealant area 103. The first, second and third sealant areas 187, 102 and 103 comprise UV epoxy, acrylic resin, epoxy mixed with acrylic resin or epoxy-acrylic copolymer. Note that, a height of the third sealant area 103 is preferably greater than that of the first sealant area 187 before performing subsequent superposing process. The third sealant area 103 serves as a dummy sealant area to compensate thickness variation of the substrates 181 and 189 during subsequent superposing process.

At least one drop of a liquid crystal 188 is dripped down on the second substrate 189. Next, a superposing process for coupling the two substrates 181 and 189 is performed. The first substrate 181 and the second substrate 189 are superposed face-to-face as shown in FIG. 10a under a condition of reduced ambient air pressure (e.g. vacuum condition), coupling the two substrates 181 and 189. Vacuum breaking is then performed to disperse the liquid crystal 188. During vacuum breaking, the second sealant area 102 can protect the first sealant area 187 from damage.

The sealant areas 187, 102 and 103 are then cured by applying curing light 105 from a side of the first substrate 181. In FIG. 10b, numeral 106 denotes a light shield corresponding to the color pixel area 183 to prevent the liquid crystal 188 from deterioration caused by the curing light 105. An ODF LCD panel is thus obtained. An operational condition of the curing is illustrated as the following, but is not intended to limit the invention. The wavelength of the curing light 105 is about between 300 nm and 500 nm. Particularly, the sealant areas 187, 102 and 103 are heated to a temperature range of 100° C. to 150° C. The heating time of curing the first sealant area 187 keeps in a range of from 0.5 to 3 hours. The first sealant area 187 absorbs 3000~8000 mJ/cm$^2$ under the curing light 105 having a wavelength of 300-500 nm.

According to FIG. 10b, because the first sealant area 187 and the black matrix area 185 are separated by the partition rib 186, the first sealant area 187 is completely hardened while applying ultraviolet light from the side of the first substrate 181 without the light shielding problems resulting from the black matrix area 185, thereby preventing pollution of the liquid crystal 188 and improving the efficiency of the liquid crystal 188. Additionally, if the sealant areas 187, 102 and/or 103 have a non-cured region, the partition rib 186 can prevent the liquid crystal 188 from sealant contamination.

Furthermore, the above liquid crystal 188, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Tenth Embodiment

Figure 11A:
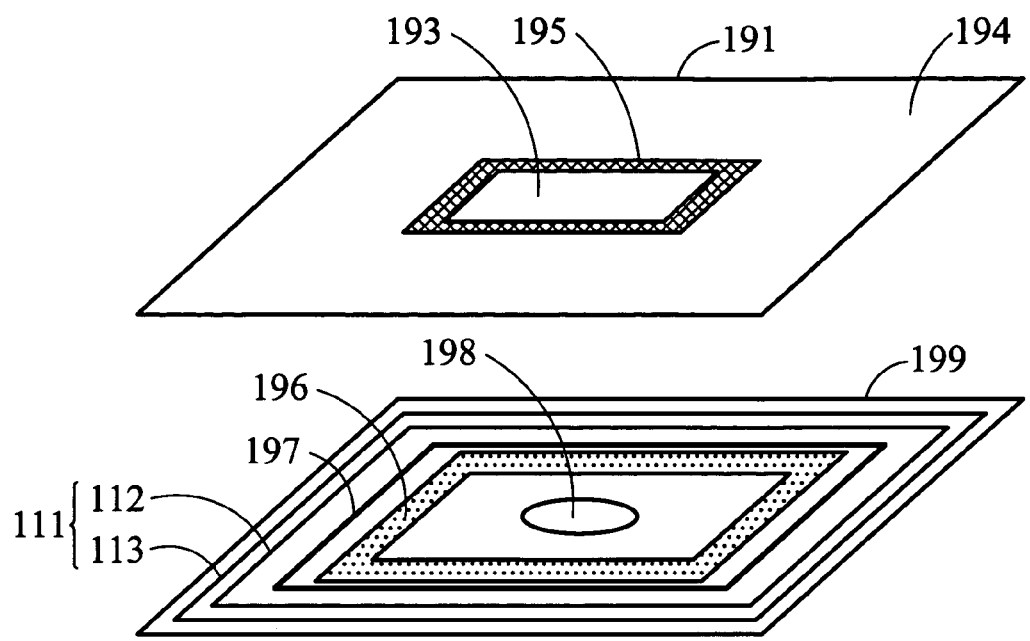
FIG. 11a is a perspective view showing an ODF LCD panel of the tenth embodiment of the invention.
Figure 11B:
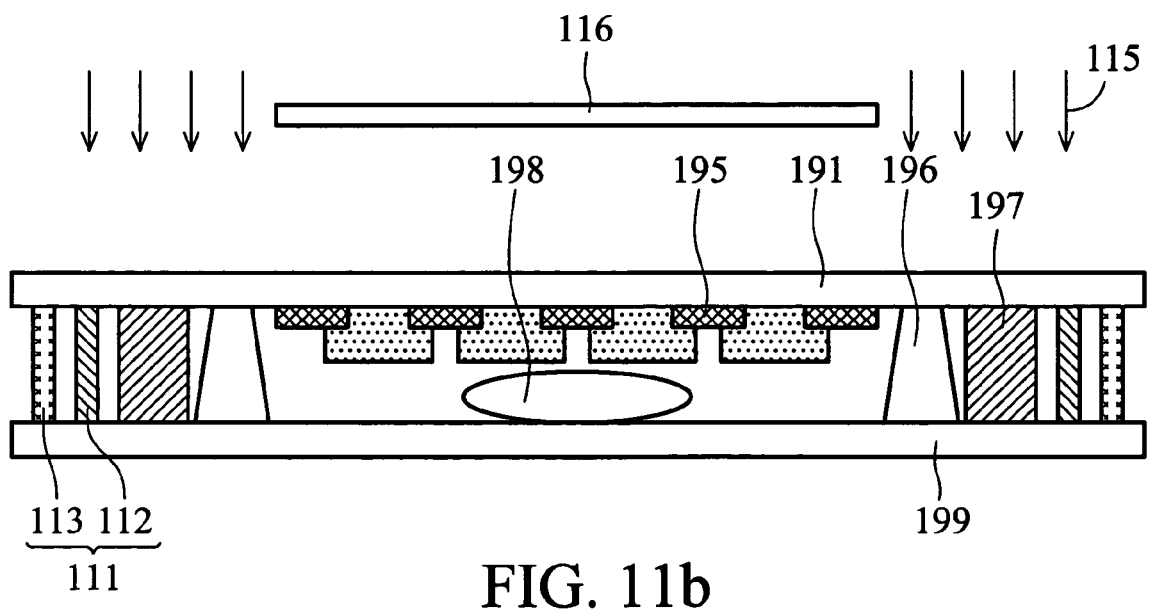

FIG. 11a is a perspective view showing an ODF LCD panel of the tenth embodiment of the invention. FIG. 11b is a sectional view showing the ODF LCD panel of FIG. 11a. A color pixel area 193 and a black matrix area 195 are formed on a first substrate 191. In FIG. 11a, a partition rib 196 is formed on a second substrate 199 and corresponds to a position opposite to the outside of the black matrix area 195 in a first peripheral region 194 of the first substrate 191. The partition rib 196 is separated from the black matrix area 195 by a second predetermined space. A first sealant area 197 is formed on the second substrate 199 and located at the outside of the partition rib 196. A sealant loop 111 can be formed on the second substrate 199 to surround the first sealant area 197. In this case, the sealant loop 111 comprises a second sealant area 112 and a third sealant area 113. The second sealant area 112 is located between the first sealant area 197 and the third sealant area 113. The first, second and third sealant areas 197, 112 and 113 comprise UV epoxy, acrylic resin, epoxy mixed with acrylic resin or epoxy-acrylic copolymer. Note that, a height of the third sealant area 113 is preferably greater than that of the first sealant area 197 before performing subsequent superposing process. The third sealant area 113 serves as a dummy sealant area to compensate thickness variation of the substrates 191 and 199 during subsequent superposing process.

At least one drop of a liquid crystal 198 is dripped down on the second substrate 199. Next, a superposing process for coupling the two substrates 191 and 199 is performed. The first substrate 191 and the second substrate 199 are superposed face-to-face as shown in FIG. 10a under a condition of reduced ambient air pressure (e.g. vacuum condition), coupling the two substrates 191 and 199. Vacuum breaking is then performed to disperse the liquid crystal 198. During vacuum breaking, the second sealant area 112 can protect the first sealant area 197 from damage.

The sealant areas 197, 112 and 113 are then cured by applying curing light 115 from a side of the first substrate 191. In FIG. 11b, numeral 116 denotes a light shield corresponding to the color pixel area 193 to prevent the liquid crystal 198 from deterioration caused by the curing light 115. An ODF LCD panel is thus obtained. An operational condition of the curing is illustrated as the following, but is not intended to limit the invention. The wavelength of the curing light 115 is about between 300 nm and 500 nm. Particularly, the sealant areas 197, 112 and 113 can also be heated to a temperature range of 100° C. to 150° C. The heating time of curing the first sealant area 197 keeps in a range of from 0.5 to 3 hours. The first sealant area 197 absorbs 3000~8000 mJ/cm$^2$ under the curing light 115 having a wavelength of 300-500 nm.

According to FIG. 11b, because the first sealant area 197 and the black matrix area 195 are separated by the partition rib 196, the first sealant area 197 is completely hardened while applying ultraviolet light from the side of the first substrate 191 without the light shielding problems resulting from the black matrix area 195, thereby preventing pollution of the liquid crystal 198 and improving the efficiency of the liquid crystal 198. Additionally, if the sealant areas 197, 112 and/or 113 have a non-cured region, the partition rib 196 can prevent the liquid crystal 198 from sealant contamination.

Furthermore, the above liquid crystal 198, for example, is a mixture, and the mixture is preferably composed of liquid crystal materials and spacers. The spacers can comprise known ball spacers or photo spacers, which are used to determine the cell thickness of the display panel, namely, the thickness of the liquid crystal layer.

Figure 12:
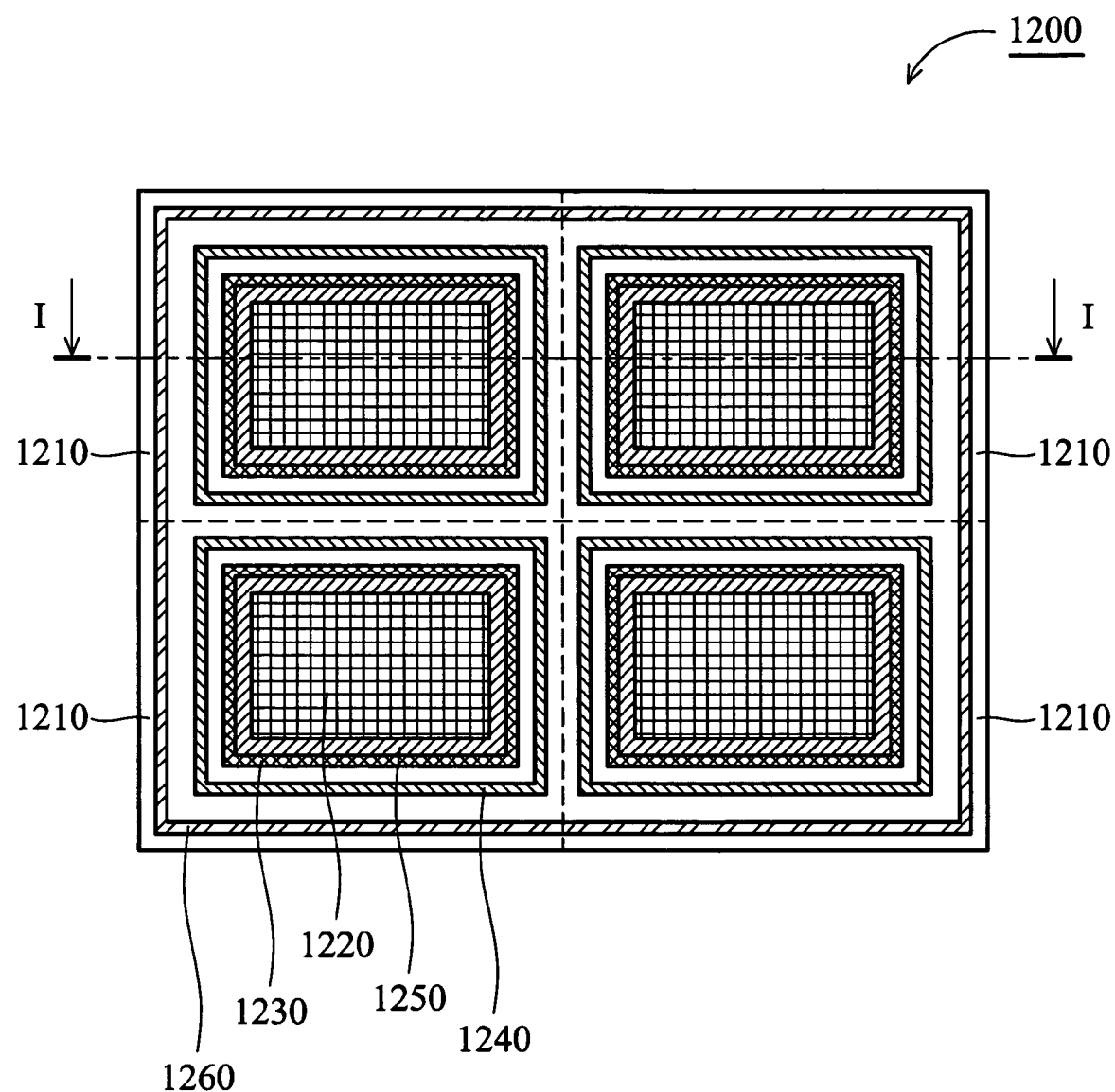
FIG. 12 is a top view schematically showing a layout of a whole ODF LCD panel according to embodiments of the invention.

FIG. 12 is a top view schematically showing a layout of a whole ODF LCD panel 1200 according to embodiments of the invention. Although four sub-panel regions 1210 are illustrated in FIG. 12, a whole LCD panel 1200 typically has numerous sub-panel regions .1210 arranged in an array. In each sub-panel region 1210, a black matrix area 1220 is surrounded by a first sealant area 1230 and a second sealant area 1240. Note that a partition rib 1250 is located between the black matrix area 1220 and the first sealant area 1230. A third sealant area 1260 is located at the peripheral region of the whole ODF LCD panel 1200 and surrounds the first sealant area 1230 and the second sealant area 1240.

Two exemplary processes for manufacturing the ODF LCD panel 1200 are described in the following, but are not intended to limit the disclosure. FIGS. 13a-13h are sectional views showing a process for manufacturing the ODF LCD panel 1200, taken alone line I-I of FIG. 12.

Figure 13A:
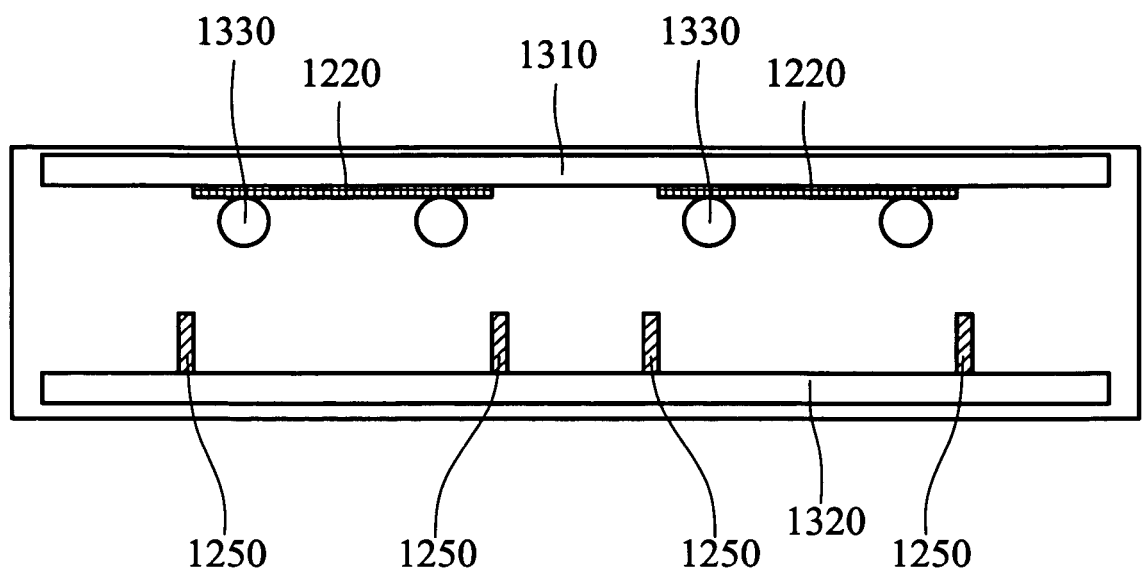
FIGS. 13a-13h are sectional views showing a process for manufacturing the ODF LCD panel according to embodiments of the invention, taken alone line I-I of FIG. 12.

In FIG. 13a, a first substrate 1310 and a second substrate 1320 opposite thereto are provided. The black matrix area 1220 is formed on the first substrate 1310. A plurality of ball spacers 1330 are spread on the first substrate 1310. The partition rib 1250 is formed on the second substrate 1320. The partition rib 1250 is a SiO$_2$ or photosensitive polymer layer. Note that the partition rib 1250 corresponds to a position opposite to the outside of the black matrix area 1220. The ball spacers 1330 are located in the black matrix area 1220.

Figure 13B:
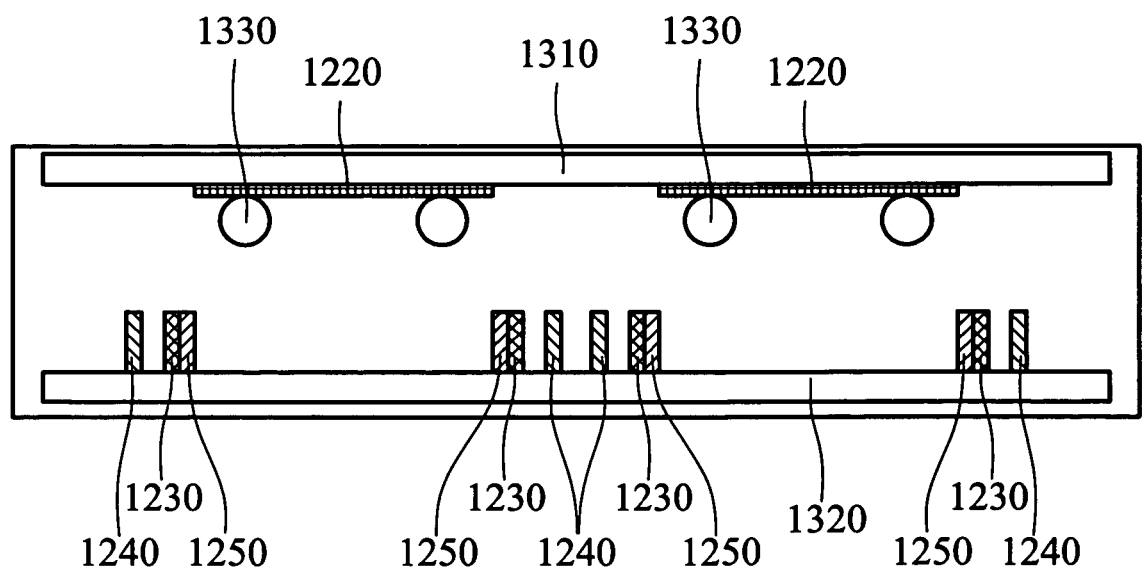

In FIG. 13b, the first sealant area 1230 and the second sealant area 1240 are formed on the second substrate 1320. The first and second sealant areas 1230 and 1240 can be formed by the same process. The first sealant area 1230 is located between the partition rib 1250 and the second sealant area 1240.

Figure 13C:
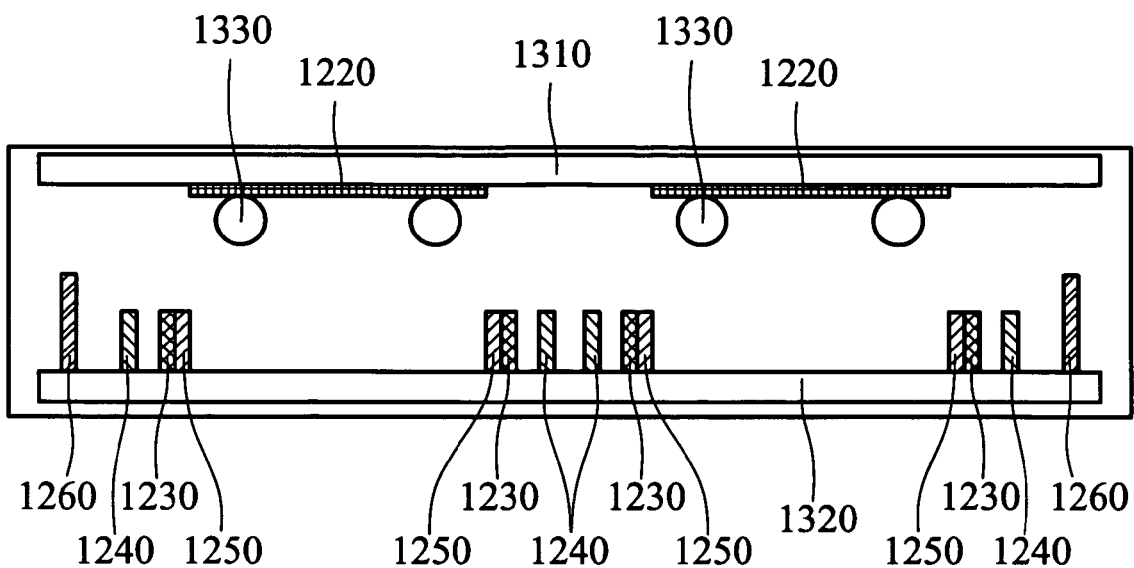

In FIG. 13c, the third sealant area 1260 is formed on the peripheral region of the second substrate 1320. Note that, a height of the third sealant area 1260 is preferably greater than that of the first sealant area 1230 before performing subsequent superposing process. The third sealant area 1260 serves as a dummy sealant area to compensate thickness variation of the substrates 1310 and 1320 during subsequent superposing process.

Figure 13D:
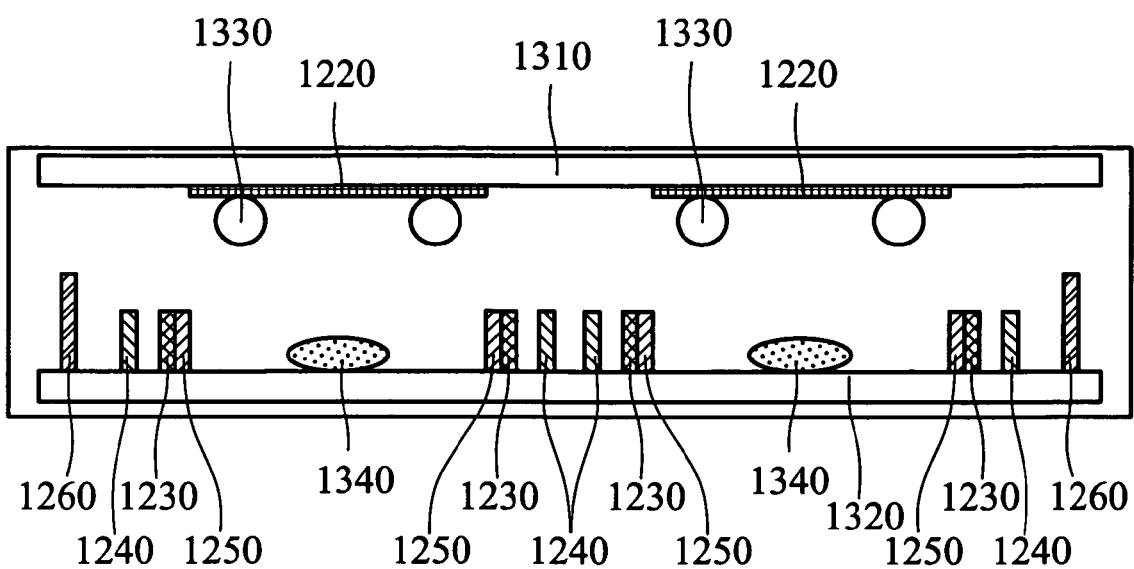

In FIG. 13d, at least one drop of a liquid crystal 1340 is dropped onto the second substrate 1320 in each sub-panel region 1210 shown in FIG. 12. With the two substrates 1310 and 1320 held spaced apart, the substrates are placed within a vacuum chamber of a vacuum assembly apparatus. Next, a vacuum process is performed.

Figure 13E:
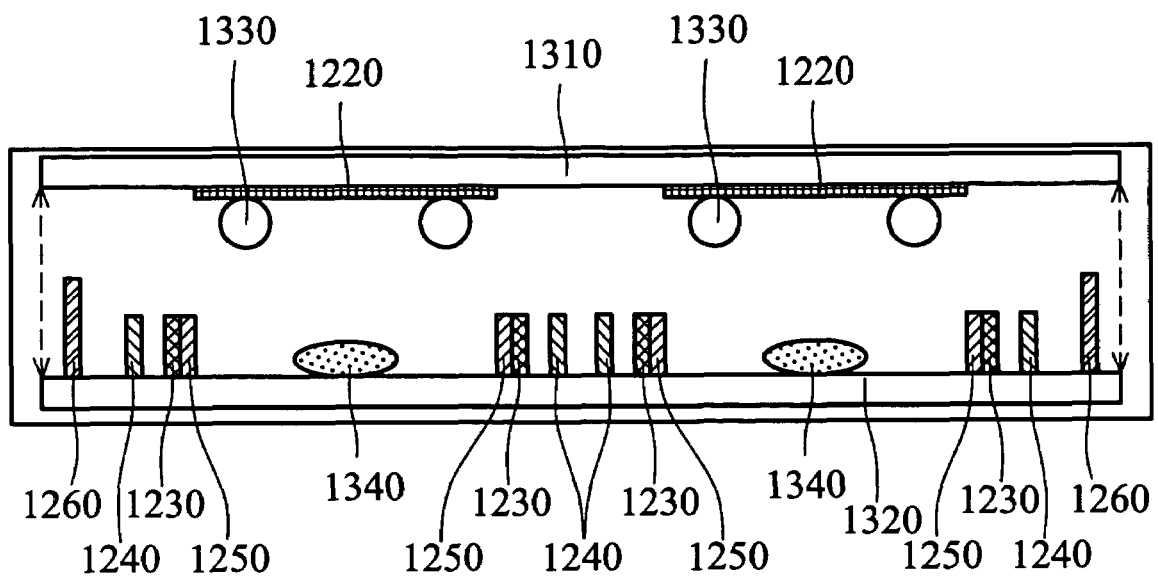
Figure 13F:
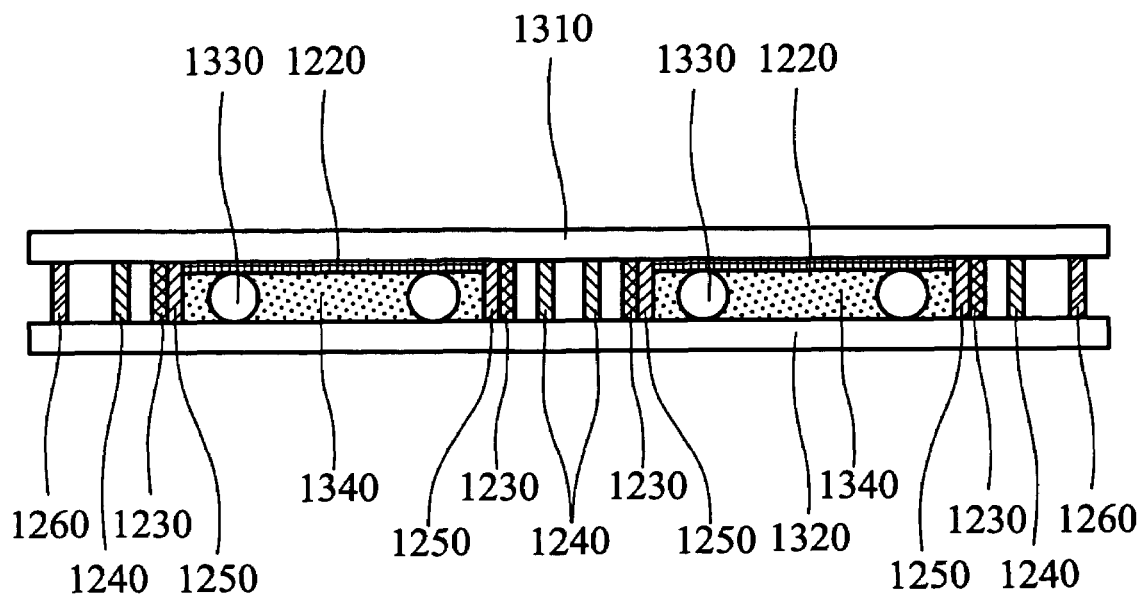

In FIG. 13e, aligning the two substrates 1310 and 1320 is performed. Next, a superposing process for coupling the two substrates 1310 and 1320 is performed. The first substrate 1310 and the second substrate 1320 are superposed face-to-face as shown in FIG. 13f under a condition of reduced ambient air pressure (e.g. vacuum condition), coupling the two substrates 1310 and 1320. The cell gap of the panel 1200 is sustained by the ball spacers 1330. Vacuum breaking is then performed to disperse the liquid crystal 1340. During vacuum breaking, the second sealant area 1240 can protect the first sealant area 1230 from damage.

Figure 13G:
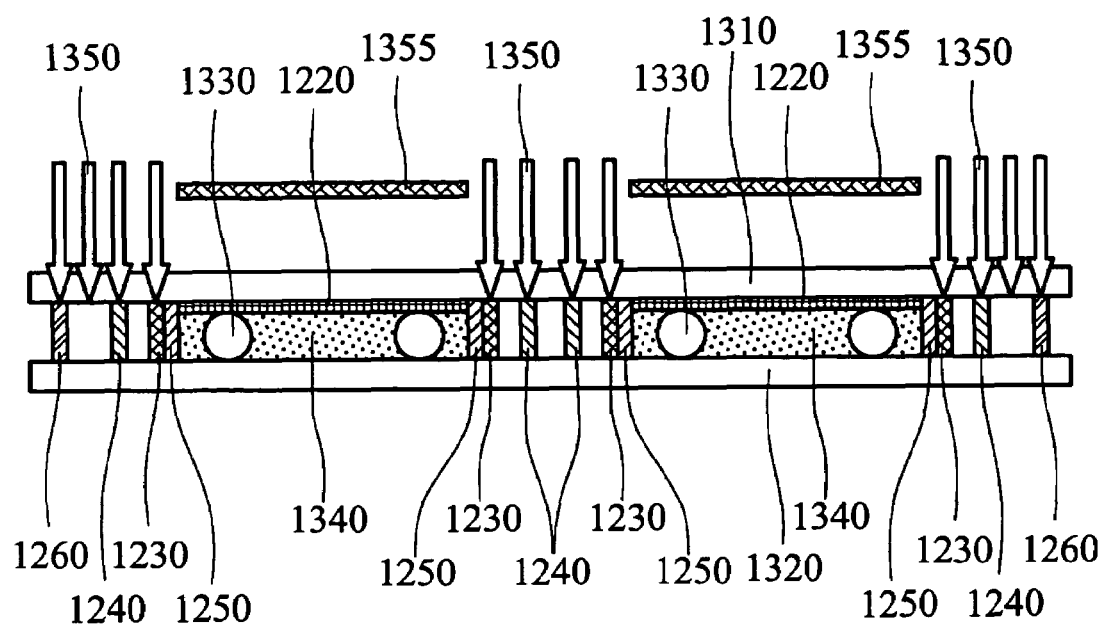
Figure 13H:
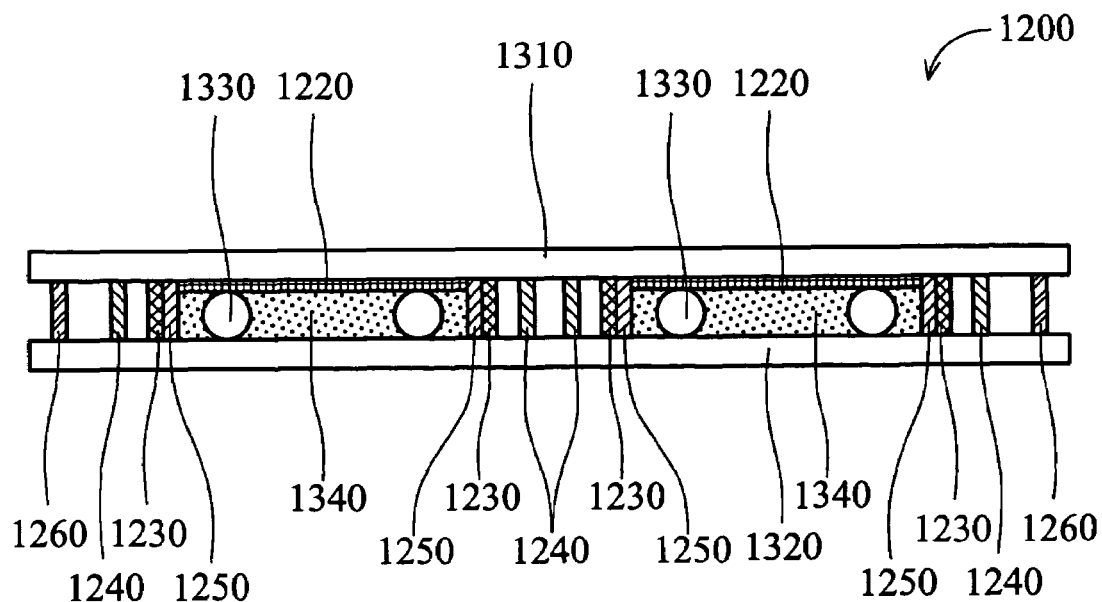

In FIG. 13g, the sealant areas 1230, 1240 and 1260 are then cured by applying curing light 1350 from a side of the first substrate 1310. In FIG. 13g, numeral 1355 denotes a light shield preventing the liquid crystal 1340 from deterioration caused by the curing light 1350. The ODF LCD panel 1200 is thus obtained, as shown in FIG. 13h. An operational condition of the curing is illustrated as the following, but is not intended to limit the invention. The wavelength of the curing light 1350 is about between 300 nm and 500 nm. Particularly, the sealant areas 1230, 1240 and 1260 can also be heated to a temperature range of 100° C. to 150° C. The heating time of curing the first sealant area 1230 keeps in a range of from 0.5 to 3 hours. The first sealant area 1230 absorbs 3000~8000 mJ/cm$^2$ under the curing light 1350 having a wavelength of 300-500 nm.

FIGS. 14a-14h are sectional views showing another process for manufacturing the ODF LCD panel 1200, taken alone line I-I of FIG. 12. In this case, photo spacers 1430 are formed rather than the ball spacers 1330. For simplicity, similar operational conditions are not described again.

Figure 14A:
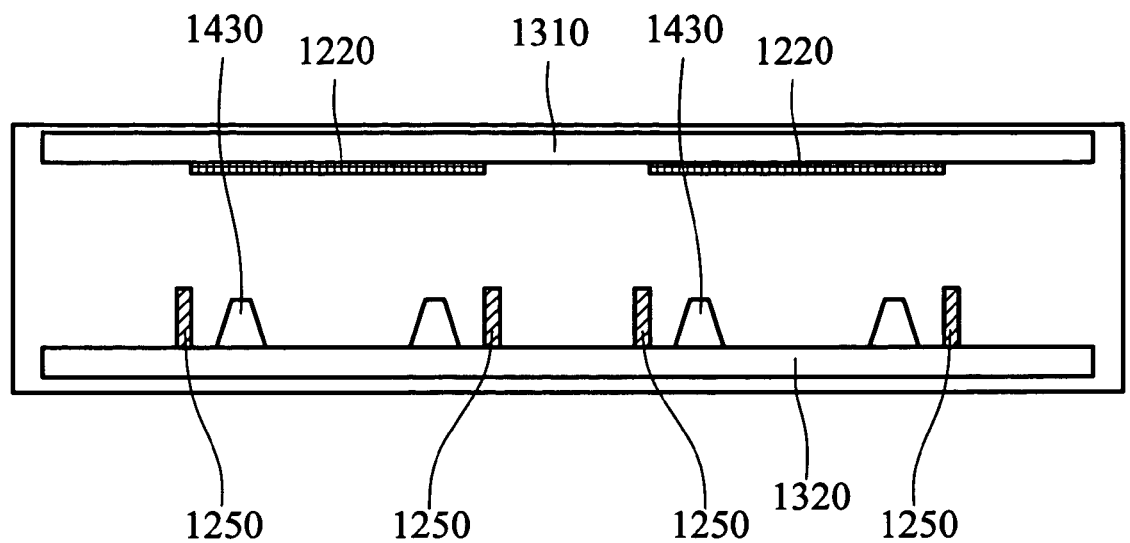
FIGS. 14a-14h are sectional views showing another process for manufacturing the ODF LCD panel according to embodiments of the invention, taken alone line I-I of FIG. 12.

In FIG. 14a, a first substrate 1310 and a second substrate 1320 opposite thereto are provided. The black matrix area 1220 is formed on the first substrate 1310. A plurality of photo spacers 1430 are formed on the second substrate 1320. The partition rib 1250 is formed on the second substrate 1320. Note that the partition rib 1250 corresponds to a position opposite to the outside of the black matrix area 1220. The photo spacers 1430 correspond to a position within the black matrix area 1220.

Figure 14B:
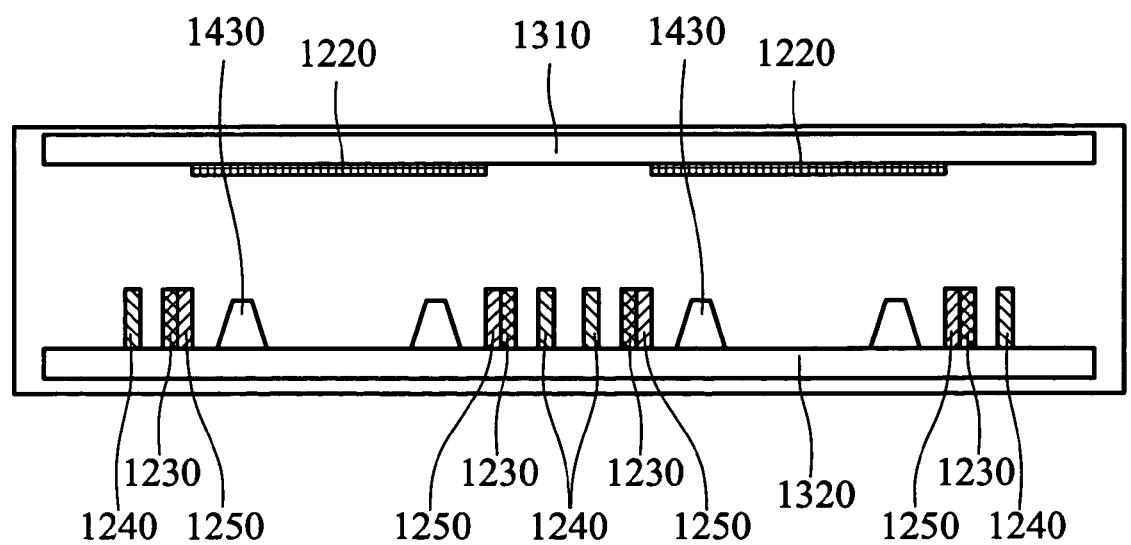
Figure 14C:
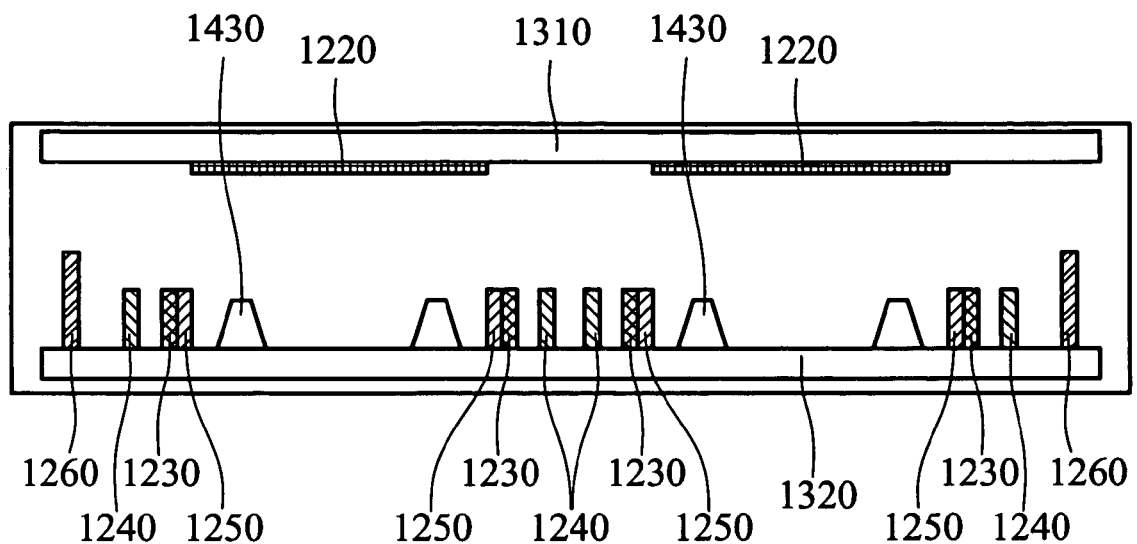
Figure 14D:
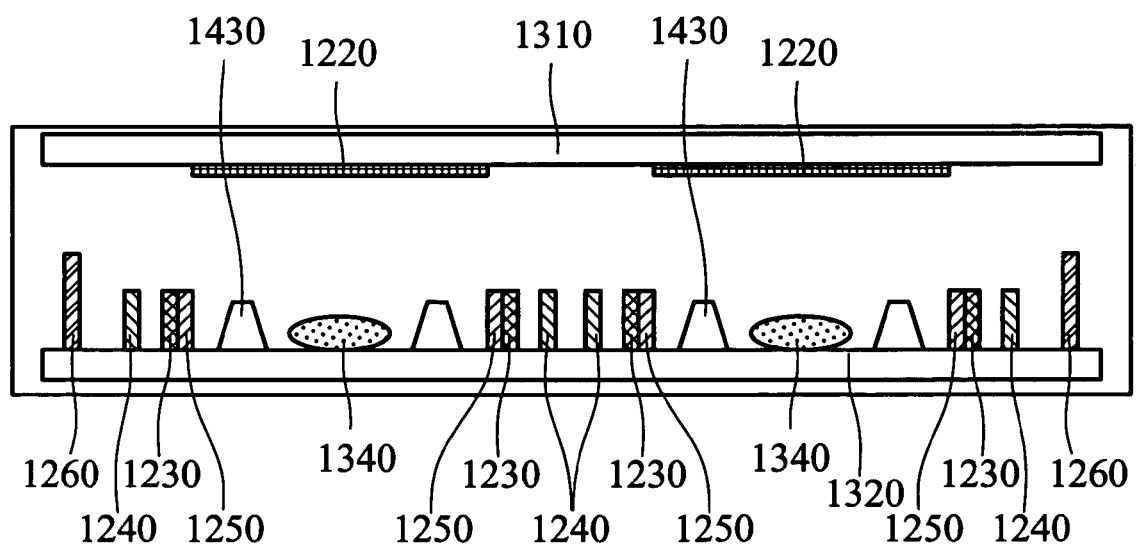

In FIG. 14b, the first sealant area 1230 and the second sealant area 1240 are formed on the second substrate 1320. In FIG. 14c, the third sealant area 1260 is formed on the peripheral region of the second substrate 1320. In FIG. 14d, at least one drop of a liquid crystal 1340 is dropped onto the second substrate 1320 in each sub-panel region 1210 shown in FIG. 12. With the two substrates 1310 and 1320 held spaced apart, the substrates are placed within a vacuum chamber of a vacuum assembly apparatus. Next, a vacuum process is performed.

Figure 14E:
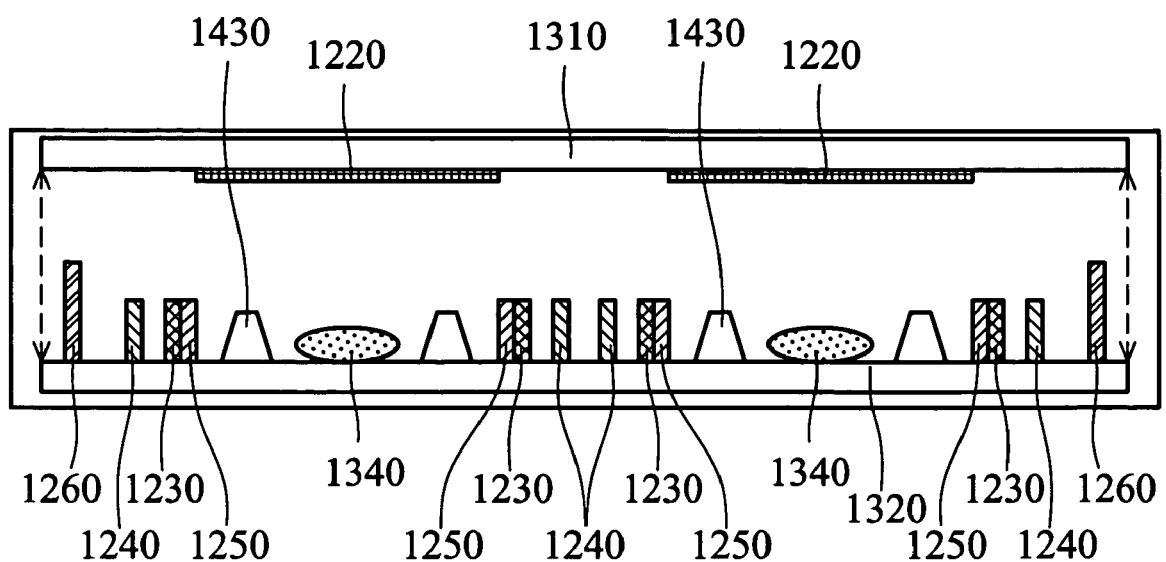
Figure 14F:
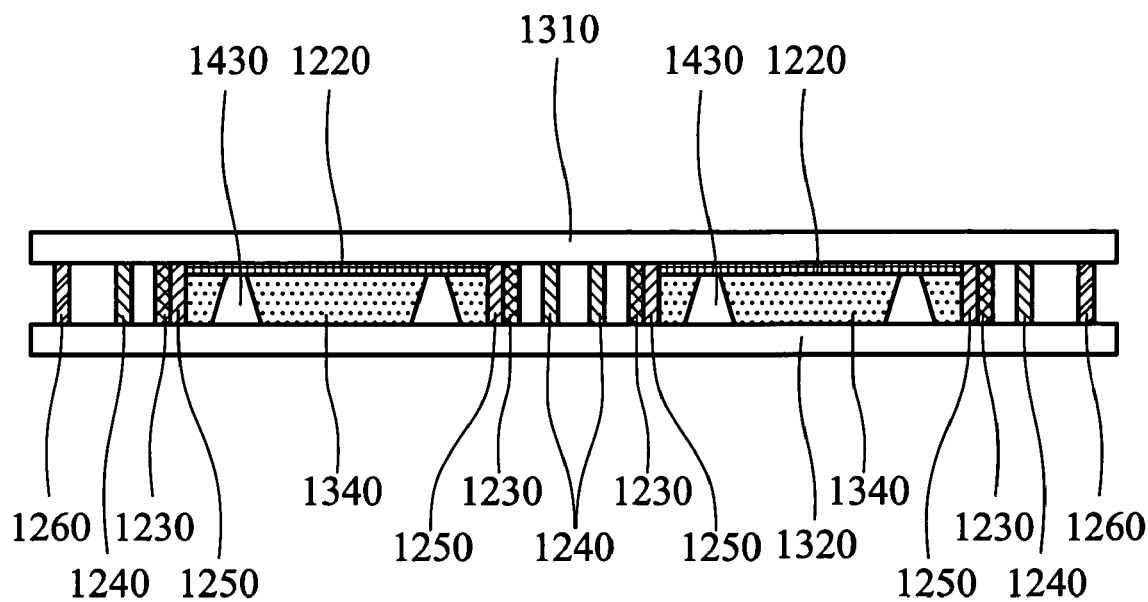

In FIG. 14e, aligning the two substrates 1310 and 1320 is performed. Next, a superposing process for coupling the two substrates 1310 and 1320 is performed. The first substrate 1310 and the second substrate 1320 are superposed face-to-face as shown in FIG. 14f under a condition of reduced ambient air pressure (e.g. vacuum condition), coupling the two substrates 1310 and 1320. The cell gap of the panel 1200 is sustained by the photo spacers 1430. Vacuum breaking is then performed to disperse the liquid crystal 1340. During vacuum breaking, the second sealant area 1240 can protect the first sealant area 1230 from damage.

Figure 14G:
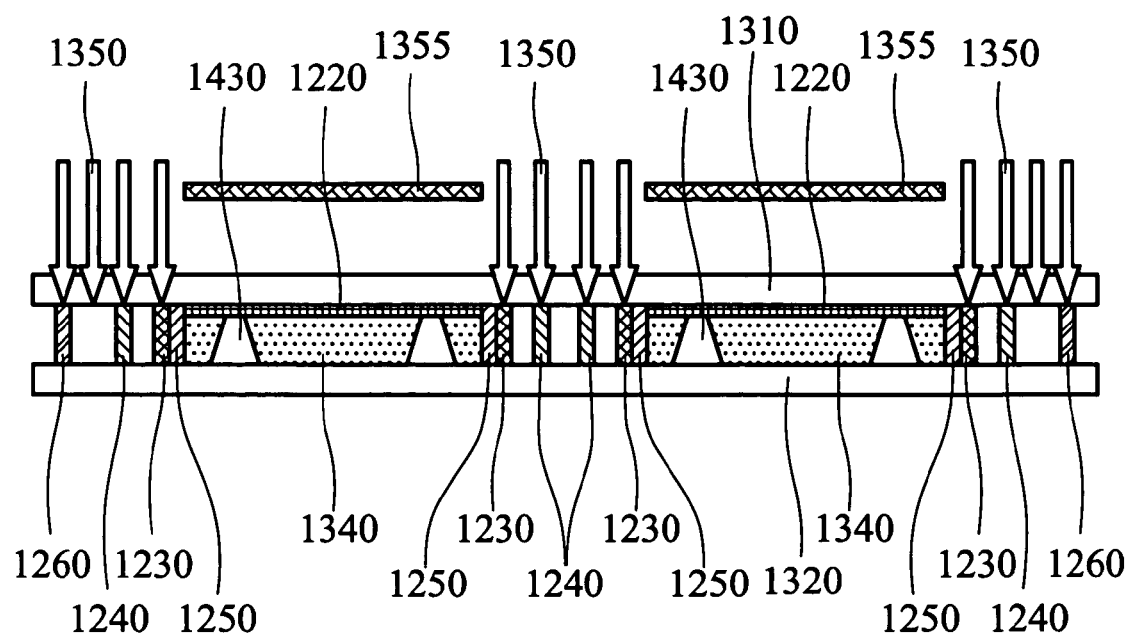
Figure 14H:
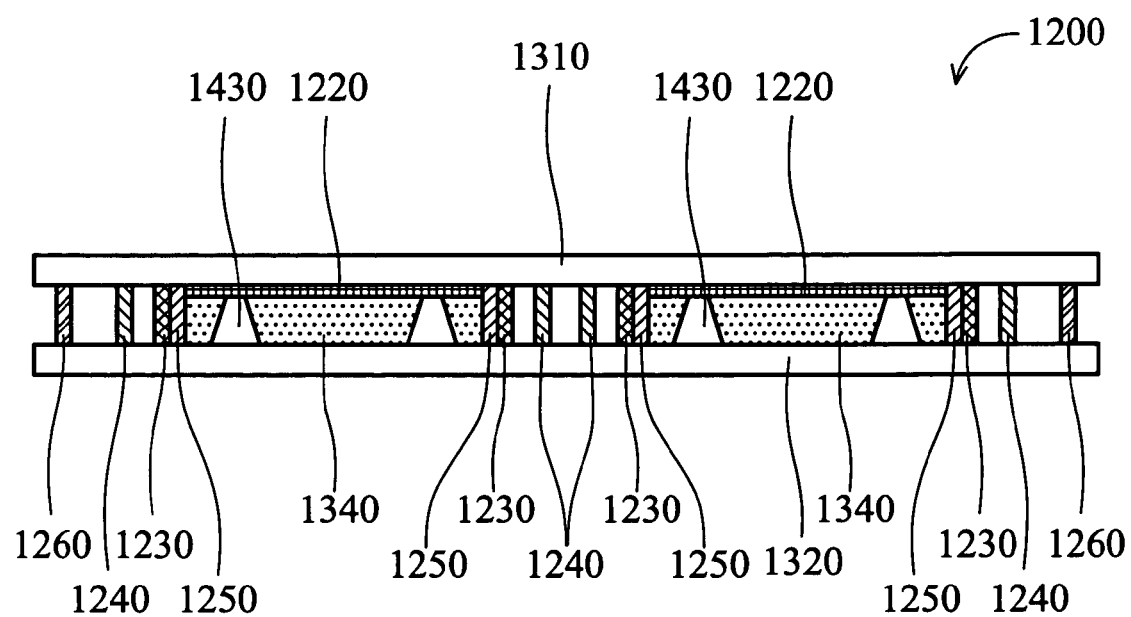

In FIG. 14g, the sealant areas 1230, 1240 and 1260 are then cured by applying curing light 1350 from a side of the first substrate 1310. In FIG. 14g, numeral 1355 denotes a light shield preventing the liquid crystal 1340 from deterioration caused by the curing light 1350. The ODF LCD panel 1200 is thus obtained, as shown in FIG. 14h.

While the invention has been described by way of example and in terms of the preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of manufacturing a one drop fill liquid crystal display panel, comprising the steps of:
   providing a first substrate comprising a first central region and a first peripheral region, wherein a color pixel area and a black matrix area are positioned on the first central region;
   providing a second substrate comprising a second central region and a second peripheral region, wherein the second central region and the second peripheral region are positioned opposite to the first central region and the first peripheral region respectively;
   forming a first sealant area on the first peripheral region at an outside of the black matrix area, wherein the first sealant area is separated from the black matrix area by a first predetermined space in a range of from 0 to 10 mm;
   dispersing at least one drop of a liquid crystal on the second central region;
   superposing the first substrate and the second substrate under a condition of reduced ambient air pressure; and
   curing the first sealant area by applying a curing light from a side of the first substrate and through the first substrate to harden the first sealant area without light shielding resulting from the black matrix area, wherein a wavelength of the curing light is about between 300 nm and 500 nm,
   wherein the first sealant area is heated to a temperature range of 100° C. to 150° C., and
   wherein a heating time of curing the first sealant area keeps in a range of from 0.5 to 3 hours.

2. The method according to claim 1, wherein the liquid crystal comprises liquid crystal materials and spacers.

3. The method according to claim 2, wherein the spacers are ball spacers or photo spacers.

4. The method according to claim 1, further comprising a step of forming a partition rib on the first peripheral region to surround the black matrix area and the liquid crystal, wherein the partition rib is located in the first predetermined space between the black matrix area and the first sealant area.

5. The method according to claim 4, wherein the partition rib overlaps an outside edge of the black matrix area.

6. The method according to claim 4, wherein the partition rib is separated from the black matrix area by a second predetermined space.

7. The method according to claim 1, further comprising a step of forming a partition rib on the second peripheral region, wherein the partition rib is located opposite to the first predetermined space between the black matrix area and the first sealant area.

8. The method according to claim 7, wherein the partition rib overlaps an outside edge of the black matrix area.

9. The method according to claim 7, wherein the partition rib is separated from the black matrix area by a second predetermined space.

10. The method according to claim 1, wherein the first sealant area comprises UV epoxy, acrylic resin, epoxy mixed with acrylic resin or epoxy-acrylic copolymer.

11. The method according to claim 1, further comprising a step of forming a second sealant area on the first peripheral region to surround the first sealant area.

12. The method according to claim 11, further comprising a step of forming a third sealant area to surround the first and second sealant areas.

13. The method according to claim 12, wherein a height of the third sealant area is greater than that of the first sealant area.

14. A method of manufacturing a one drop fill liquid crystal display panel, comprising the steps of:
   providing a first substrate comprising a first central region and a first peripheral region, wherein a color pixel area and a black matrix area are positioned on the first central region;
   providing a second substrate comprising a second central region and a second peripheral region, wherein the second central region and the second peripheral region are positioned opposite to the first central region and the first peripheral region respectively;
   forming a first sealant area and at least one second sealant area on the first or second peripheral region, and the second sealant area surrounds the first sealant area;
   dispersing at least one drop of a liquid crystal on the second central region;
   superposing the first substrate and the second substrate under a condition of reduced ambient air pressure; and
   curing the first sealant area by applying a curing light from a side of the first substrate and through the first substrate to harden the first sealant area without light shielding resulting from the black matrix area, wherein the first sealant area absorbs 3000~8000 $mJ/cm_2$ provided by the curing light,
   wherein the first sealant area is heated to a temperature range of 100° C. to 150° C., and
   wherein a heating time of curing the first sealant area keeps in a range of from 0.5 to 3 hours.

15. The method according to claim 14, wherein the first sealant area is separated from the black matrix area by a first predetermined space in a range of from 0 to 10 mm.

16. The method according to claim 14, further comprising a step of forming a partition rib between the black matrix area and the first sealant area.

17. The method according to claim 16, wherein the partition rib is separated from the black matrix area by a second predetermined space.

18. The method according to claim 14, further comprising a light shield corresponds to the color pixel area.

19. The method according to claim 14, wherein a wavelength of the curing light is about between 300 nm and 500 nm.

20. A method of manufacturing a one drop fill liquid crystal display panel, comprising the steps of:
- providing a first substrate comprising a first central region and a first peripheral region;
- providing a second substrate comprising a second central region and a second peripheral region, wherein a color pixel area and a black matrix area are positioned on the first or the second central region, and wherein the second central region and the second peripheral region are positioned opposite to the first central region and the first peripheral region respectively;
- forming a first sealant area on the first or the second peripheral region at an outside of the black matrix area, wherein the first sealant area is separated from the black matrix area by a first predetermined space in a range of from 0 to 10 mm;
- dispersing at least one drop of a liquid crystal on the second central region;
- superposing the first substrate and the second substrate under a condition of reduced ambient air pressure; and
- curing the first sealant area by applying a curing light from a side of the first substrate and through the first substrate to harden the first sealant area without light shielding resulting from the black matrix area, wherein a wavelength of the curing light is about between 300 nm and 500 nm,
- wherein the first sealant area is heated to a temperature range of 100° C. to 150° C., and
- wherein a heating time of curing the first sealant area keeps in a range of from 0.5 to 3 hours.

* * * * *